(12) United States Patent
Kutliroff et al.

(10) Patent No.: US 10,229,542 B2
(45) Date of Patent: Mar. 12, 2019

(54) 3-DIMENSIONAL SCENE ANALYSIS FOR AUGMENTED REALITY OPERATIONS

(71) Applicant: INTEL CORPORATION, Santa Clara, CA (US)

(72) Inventors: Gershom Kutliroff, Alon Shvut (IL); Yaron Yanai, Modi'in (IL); Shahar Fleishman, Hod Hasharon (IL); Mark Kliger, Modi'in (IL)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/046,614

(22) Filed: Feb. 18, 2016

(65) Prior Publication Data

US 2017/0243352 A1     Aug. 24, 2017

(51) Int. Cl.
*G06K 9/00* (2006.01)
*G06T 19/00* (2011.01)
*G06T 7/10* (2017.01)

(52) U.S. Cl.
CPC .............. *G06T 19/006* (2013.01); *G06T 7/10* (2017.01); *G06T 2207/10021* (2013.01); *G06T 2207/10024* (2013.01); *G06T 2207/10028* (2013.01); *G06T 2207/30244* (2013.01)

(58) Field of Classification Search
CPC ..................... G06T 19/006; G06T 7/10; G06T 2207/30244; G06T 2207/10028; G06T 2207/10021; G06T 2207/10024
USPC .... 463/33, 31; 382/103, 154, 106, 164, 165, 382/181, 199, 224, 282, 283, 284, 285, 382/291, 293, 294; 345/424, 619
See application file for complete search history.

(56) References Cited

U.S. PATENT DOCUMENTS

| | | | |
|---|---|---|---|
| 8,488,877 B1 | 7/2013 | Owechko et al. | |
| 8,571,328 B2 | 10/2013 | Shechtman et al. | |
| 8,849,039 B2 | 9/2014 | Pham et al. | |
| 8,861,840 B2 | 10/2014 | Bell et al. | |

(Continued)

OTHER PUBLICATIONS

Breen, David E., et al. "Interactive occlusion and automatic object placement for augmented reality." Computer Graphics Forum. vol. 15. No. 3. Blackwell Science Ltd, 1996.*

(Continued)

*Primary Examiner* — Aaron W Carter
(74) *Attorney, Agent, or Firm* — Finch & Maloney PLLC

(57) ABSTRACT

Techniques are provided for 3D analysis of a scene including detection, segmentation and registration of objects within the scene. The analysis results may be used to implement augmented reality operations including removal and insertion of objects and the generation of blueprints. An example method may include receiving 3D image frames of the scene, each frame associated with a pose of a depth camera, and creating a 3D reconstruction of the scene based on depth pixels that are projected and accumulated into a global coordinate system. The method may also include detecting objects, and associated locations within the scene, based on the 3D reconstruction, the camera pose and the image frames. The method may further include segmenting the detected objects into points of the 3D reconstruction corresponding to contours of the object and registering the segmented objects to 3D models of the objects to determine their alignment.

25 Claims, 19 Drawing Sheets
(8 of 19 Drawing Sheet(s) Filed in Color)

(56) References Cited

U.S. PATENT DOCUMENTS

| | | | |
|---|---|---|---|
| 8,942,917 B2 | 1/2015 | Chrysanthakopoulos | |
| 9,083,960 B2 | 7/2015 | Wagner et al. | |
| 9,158,971 B2 | 10/2015 | Gaidon et al. | |
| 9,171,403 B2 | 10/2015 | Shapira et al. | |
| 9,201,499 B1* | 12/2015 | Chang | G06F 3/011 |
| 9,378,431 B2 | 6/2016 | Stoeffler et al. | |
| 9,436,987 B2 | 9/2016 | Ding et al. | |
| 9,438,891 B2 | 9/2016 | Mannion et al. | |
| 9,525,862 B2 | 12/2016 | Benhimane et al. | |
| 9,626,737 B2 | 4/2017 | Frushour et al. | |
| 9,639,943 B1 | 5/2017 | Kutliroff et al. | |
| 9,665,937 B2 | 5/2017 | Luo | |
| 9,699,380 B2* | 7/2017 | Somanath | H04N 5/23238 |
| 9,779,508 B2 | 10/2017 | Pradeep et al. | |
| 2007/0031064 A1* | 2/2007 | Zhao | G06K 9/00214 |
| | | | 382/285 |
| 2009/0128577 A1 | 5/2009 | Gloudemans | |
| 2009/0232355 A1 | 9/2009 | Minear et al. | |
| 2009/0232388 A1 | 9/2009 | Minear et al. | |
| 2010/0079456 A1 | 4/2010 | Barth | |
| 2010/0207936 A1 | 8/2010 | Minear et al. | |
| 2010/0289817 A1* | 11/2010 | Meier | G06T 15/20 |
| | | | 345/619 |
| 2011/0116698 A1 | 5/2011 | Weis | |
| 2011/0194732 A1 | 8/2011 | Tsuji | |
| 2012/0194644 A1 | 8/2012 | Newcombe et al. | |
| 2012/0195471 A1* | 8/2012 | Newcombe | G06T 7/194 |
| | | | 382/106 |
| 2012/0306876 A1 | 12/2012 | Shotton | |
| 2013/0170696 A1 | 7/2013 | Zhu et al. | |
| 2013/0181983 A1 | 7/2013 | Kitamura et al. | |
| 2014/0003705 A1 | 1/2014 | Taguchi et al. | |
| 2014/0037189 A1 | 2/2014 | Ziegler et al. | |
| 2014/0105486 A1* | 4/2014 | Tamaazousti | G06T 7/0044 |
| | | | 382/154 |
| 2014/0206443 A1* | 7/2014 | Sharp | G06T 7/0075 |
| | | | 463/31 |
| 2014/0340489 A1* | 11/2014 | Medioni | G06K 9/46 |
| | | | 348/50 |
| 2015/0006117 A1 | 1/2015 | Zhang et al. | |
| 2015/0231490 A1 | 8/2015 | Graepel | |
| 2015/0262412 A1* | 9/2015 | Gruber | G06T 15/50 |
| | | | 345/426 |
| 2015/0347872 A1 | 12/2015 | Taylor et al. | |
| 2016/0012646 A1 | 1/2016 | Huang et al. | |
| 2016/0171755 A1* | 6/2016 | Karsch | G06T 15/50 |
| | | | 382/154 |
| 2016/0189381 A1 | 6/2016 | Rhoads | |
| 2016/0189419 A1 | 6/2016 | Fakih et al. | |
| 2016/0196659 A1* | 7/2016 | Vrcelj | G06K 9/34 |
| | | | 382/154 |
| 2017/0046868 A1 | 2/2017 | Chernov et al. | |
| 2017/0228940 A1* | 8/2017 | Kutliroff | G06T 19/20 |
| 2017/0243352 A1 | 8/2017 | Kutliroff et al. | |
| 2017/0278231 A1 | 9/2017 | Narasimha | |
| 2017/0341237 A1 | 11/2017 | Jain et al. | |
| 2017/0345181 A1 | 11/2017 | Yu et al. | |
| 2017/0372489 A1 | 12/2017 | Tabuchi et al. | |
| 2018/0005015 A1 | 1/2018 | Hou et al. | |

OTHER PUBLICATIONS

Mian, Ajmal S., Mohammed Bennamoun, and Robyn Owens. "Three-dimensional model-based object recognition and segmentation in cluttered scenes." IEEE transactions on pattern analysis and machine intelligence28.10 (2006): 1584-1601.*

International Search Report International Patent Application No. PCT/US2017/012543, dated Apr. 20, 2017, 5 pages.

International Search Report International Patent Application No. PCT/US2017/013353, dated Apr. 27, 2017, 5 pages.

Girshick, R. et al., "Rich feature hierarchies for accurate object detection and semantic segmentation", IEEE Conference on Computer Vision and Pattern Recognition (CVPR), 2014, 8 pages.

Krizhevsky, A. et al., "Imagenet Classification with Deep Convolutional Neural Networks", Advances in Neural Information Processing Systems 25 Conference, 2012, 9 pages.

Song, S. et al., "Robot in a room: toward perfect object recognition in closed environment", Jul. 2015, 10 pages, <arXiv:1507.02703>.

Grigorescu, S. et al., "Robust feature extraction for 3D reconstruction of boundary segmented objects in a robotic library scenario", IEEE RSJ International Conference on Intelligent Robots and Systems, Oct. 2010, 8 pages.

Non Final Rejection received in U.S. Appl. 15/209,014 (dated Mar. 5, 2018) (10 pages).

Final Rejection received in U.S. Appl. 15/209,014 (dated Aug. 15, 2018) (13 pages).

Written Opinion of the International Searching Authority for International Patent Application PCT/US2017/013353, dated Apr. 27, 2017, 8 pages.

Written Opinion of the International Searching Authority for International Patent Application PCT/US2017/012543, dated Apr. 20, 2017, 7 pages.

* cited by examiner

RGB Image Frame
202

Depth Map Frame
204

400

3-DIMENSIONAL SCENE ANALYSIS FOR AUGMENTED REALITY OPERATIONS

BACKGROUND

Augmented reality (AR) applications attempt to blend virtual objects into real world images in a manner that appears seamless to the user in order to create a compelling AR experience. Existing AR systems typically rely on a combination of standard camera pose calculations and object recognition techniques that tend to be insufficient on their own to provide a convincing fusion of the real and the virtual. Furthermore, existing techniques that merge homogeneous regions together often have difficulty in joining heterogeneous regions of the same object into a single segment. As a result, virtual objects rendered into the camera's video stream can appear at odd, unnatural angles, and contain visible artifacts. The overall effect is generally awkward and displeasing to the user.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Features and advantages of embodiments of the claimed subject matter will become apparent as the following Detailed Description proceeds, and upon reference to the Drawings, wherein like numerals depict like parts.

Although the following Detailed Description will proceed with reference being made to illustrative embodiments, many alternatives, modifications, and variations thereof will be apparent to those skilled in the art.

DETAILED DESCRIPTION

Generally, this disclosure provides techniques for 3-Dimensional (3D) scene analysis, the results of which may facilitate augmented reality (AR) operations to be performed on the scene. In a more general sense, the techniques can be used to modify an image of a scene by adding one or more objects to that scene, so as to provide an augmented image. In accordance with an embodiment, the 3D scene analysis techniques generate data that describes a real-world scene as imaged by a depth camera from various perspectives. In particular, the objects in the scene are detected and recognized, their respective orientations and 3D poses are calculated, and each object is segmented and mapped to an associated group of points in a 3D reconstruction of the scene. Additionally, the objects may be registered or aligned to preexisting 3D models of the objects, as generated for example by computer aided design (CAD) systems or scanning techniques. The analysis results provide the capability to perform a number of manipulations of the scene in a more realistic manner as compared to conventional AR systems. For example, selected objects may be deleted from the scene and new virtual objects can be rendered into the scene, as additions or replacements, in a relatively realistic manner. In some embodiments, the new virtual objects may be selected by a user from a catalog. Similarly, the understanding of the scene provided by the analysis can serve as a basis for insertion of annotations into the scene, such as, for example, object size measurements, distance measurements, user assistance prompts, etc. Additionally, blueprints of the scene may be generated.

A typical real-world scene may include a complex distribution of various objects, some of which may occlude others, as well as structural elements such as the walls, floor and ceiling. Placing virtual objects convincingly into the scene, and accurately segmenting out real objects requires knowledge of the positions of the real objects relative to each other, and identification of the groups of pixels associated with the objects. The analysis techniques described herein provide such an understanding of the scene including its composition, the objects it contains, and the relationships between them. As will be appreciated in light of this disclosure, the scene analysis and image modification techniques provided herein can be implemented in hardware or software or a combination thereof, and may be adapted into any number of applications where scene analysis and AR operations are desired.

Figure 1:
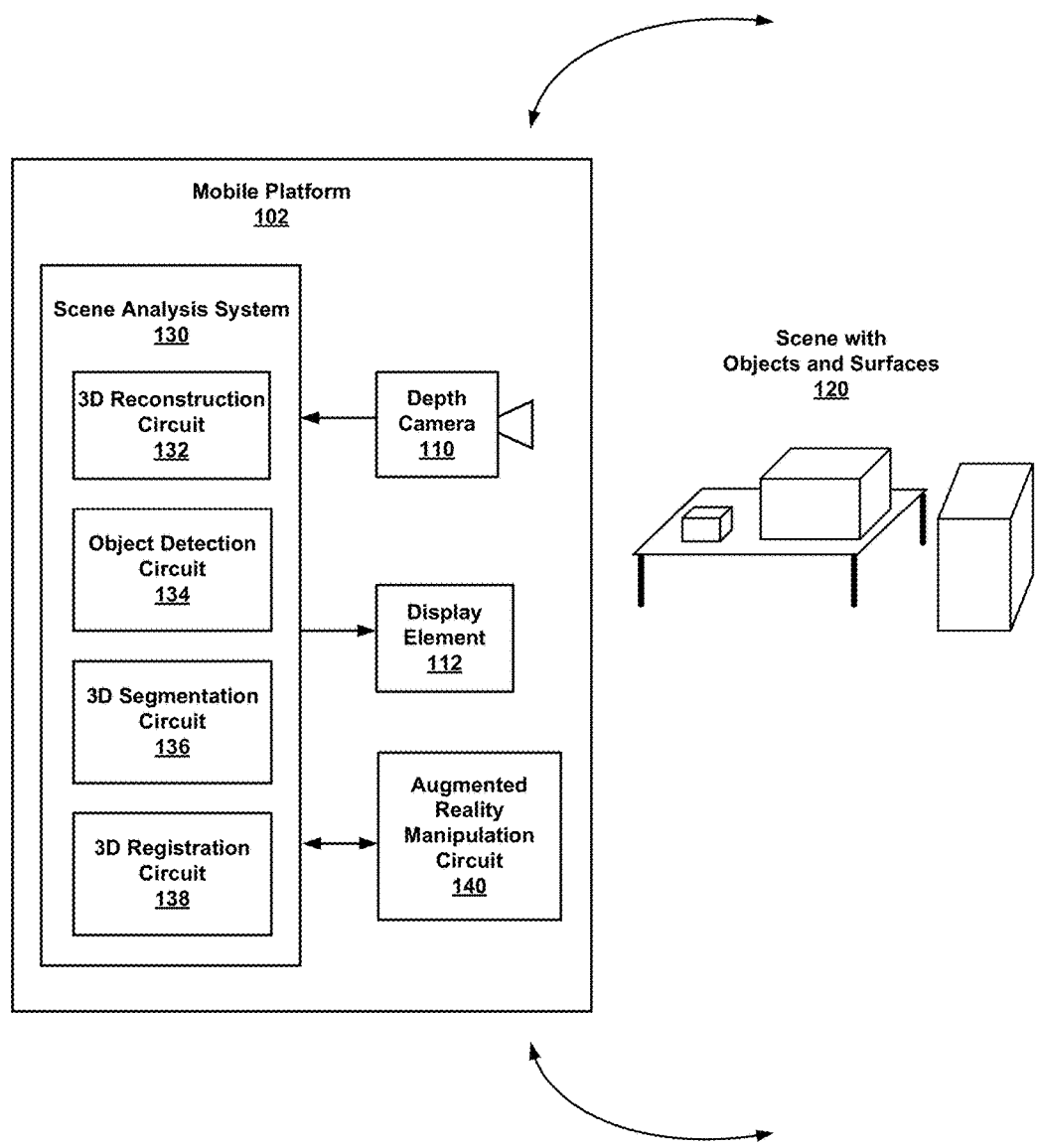
FIG. 1 is a top level block diagram of a system for 3-Dimensional (3D) scene analysis, in accordance with certain of the embodiments disclosed herein.

FIG. 1 is a top level block diagram 100 of a system for 3D scene analysis and AR manipulation, in accordance with certain of the embodiments disclosed herein. A scene analysis system 130 is shown to include a 3D reconstruction circuit 132, an object detection circuit 134, a 3D segmentation circuit 136 and a 3D registration circuit 138. In some embodiments, the scene analysis system 130, along with an AR manipulation circuit 140, may be integrated into a mobile platform 102 along with a depth camera 110 and a display element 112. The mobile platform 102 may be a tablet or smartphone or other such similar device. The depth camera may be configured as a rear mounted camera on the platform to facilitate scanning of the scene 120 as the user moves with respect to the scene to capture 3D image frames from multiple perspectives or camera poses. In some embodiments, the depth camera may be configured to capture a stream of images at a relatively high frame rate, for example 30 frames per second or more. Each 3D image frame may comprise a color image frame that provides color (e.g., red, green and blue or RGB) pixels, and a depth map frame that provides depth pixels. The scene 120 may include one or more objects of interest, some of which may be positioned or otherwise resting on surface planes, such as tables, shelves or the floor.

At a top level, the 3D reconstruction circuit 132 may be configured to generate a 3D reconstruction of the scene comprising points in 3D space corresponding to structures within the scene. The object detection circuit 134 may be configured to detect, recognize and locate objects of interest within the scene. The 3D segmentation circuit 136 may be configured to generate an estimate of 3D boundaries of objects of interest in the scene based on 3D images obtained from a number of poses of a depth camera. The estimated boundaries may be expressed as a set of 3D pixels associated with the boundary. The 3D registration circuit 138 may be configured to operate on each of the detected objects in the scene, along with the associated segmented region, to obtain a 3D alignment of the object in the scene. The AR manipulation circuit 140 may be configured to allow the user to delete, insert and/or replace objects within the scene based on information obtained from the scene analysis system 130, as will be explained in greater detail below.

Figure 2:
FIG. 2 illustrates an example color image and depth map, in accordance with certain of the embodiments disclosed herein.
Figure 2:
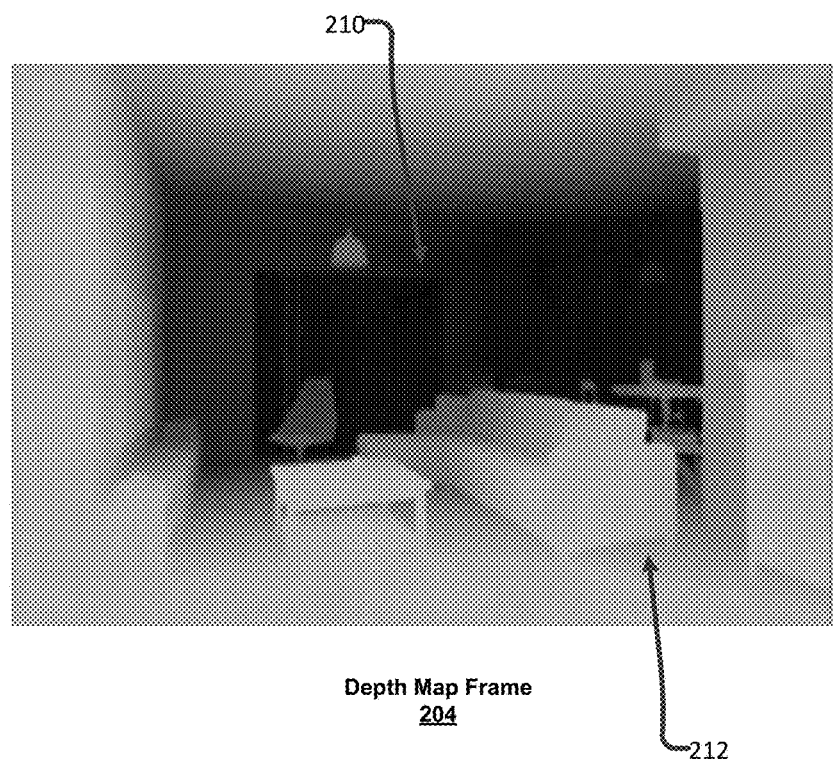

FIG. 2 illustrates an example color image and depth map, in accordance with certain of the embodiments disclosed herein. An RGB image frame 202 is shown alongside a corresponding depth map frame 204 of a scene of a furnished room provided by a depth camera. The scene includes a variety of objects such as a table, lamp, sofa, etc. The RGB frame 202 captures color data represented by RGB pixels of the image, although other color schemes are possible. In the depth map frame 204, each pixel represents the distance between that region of the scene and the camera. This can be done through the intensity value of each pixel. In the depth map frame 204, for example, the pixel indicates proximity to the camera. In particular, regions with darker (more intense) pixels 210 are relatively far from the camera, while lighter (less intense) pixels 212 are closer. In addition, the operational parameters of the camera, such as focal length and principal axis, are known or provided so that each depth pixel can be projected into a 3D position in the scene relative to the camera. Furthermore the RGB and depth components of the camera may be calibrated, both spatially and temporally, to improve the accuracy of the RGB values and the depth values of each individual pixel.

Figure 3:
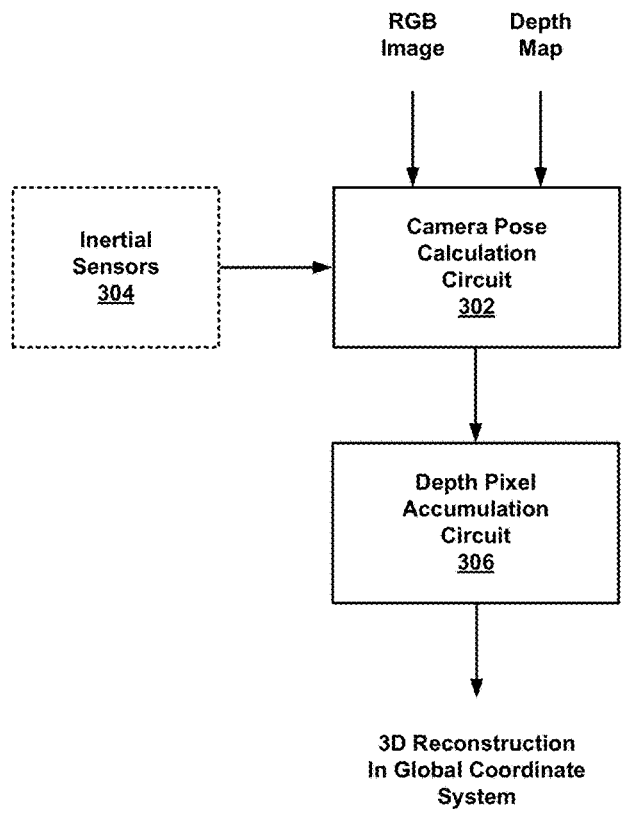
FIG. 3 is a more detailed block diagram of a 3D reconstruction circuit, configured in accordance with certain of the embodiments disclosed herein.
Figure 4:
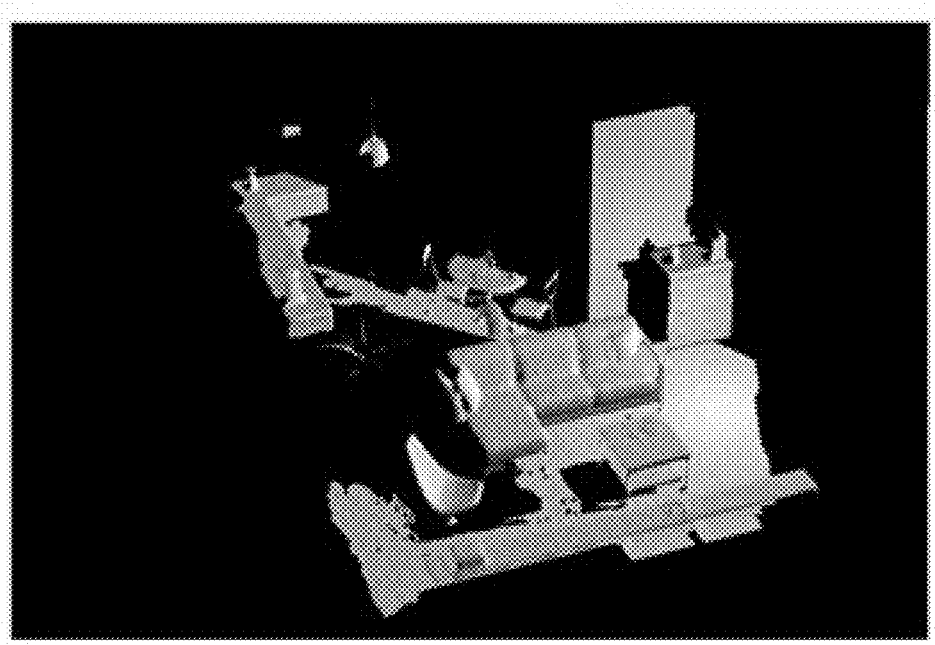
FIG. 4 illustrates an example of a 3D scene reconstruction, in accordance with certain of the embodiments disclosed herein.

FIG. 3 is a more detailed block diagram of a 3D reconstruction circuit 132, configured in accordance with certain of the embodiments disclosed herein. The reconstruction circuit is shown to include a camera pose calculation circuit 302, a depth pixel accumulation circuit 306 and, in some embodiments, inertial sensors 304 such as, for example, a gyroscope and/or an accelerometer. An example rendering 400 of a 3D reconstruction of the scene shown in FIG. 2 is illustrated in FIG. 4. This 3D reconstruction is composed of a relatively large number of points in 3D space, corresponding to structures within the scene, and may be represented in one of several ways including, for example, a signed distance function in a volumetric structure, or, equivalently, a polygonal mesh. A 3D reconstruction of a scene generally includes at least two operations: calculation of the camera pose, and accumulation of the depth pixels into a global coordinate system.

As new RGB and depth frames of the scene 120 are captured by depth camera 110 they are provided to the camera pose calculation circuit 302. The camera pose calculation circuit 302 may be configured to compute and update the position and orientation (or pose) of the camera. The calculated pose of the camera is the 3D transformation from the position and orientation of the camera in a previous frame, to its position and orientation in the current frame. Three parameters may describe the translation of the camera between consecutive frames (e.g., x, y and z). Three additional parameters may describe the change in orientation (e.g., yaw, pitch and roll angle) for a total of six degrees of freedom (6DOF) that are computed to determine the updated pose of the camera relative to its pose in the previous frame. Determination of the camera pose for each frame can be used to establish a global coordinate system, consistent across all captured frames, in which the 3D points extracted from the depth map can be projected and accumulated by depth pixel accumulation circuit 306. The calculation of the camera pose may be performed in real-time.

In some embodiments, the camera pose may be calculated using an RGB-based Simultaneous Localization and Mapping (SLAM) algorithm which is configured to extract feature descriptors from each RGB frame, match corresponding features across multiple frames and calculate the 6DOF camera pose for each frame through triangulation. Alternatively, data from inertial sensors 304, such as gyroscopes and accelerometers, may be used, either independently, or in combination with the results of the RGB SLAM technique to obtain a more robust estimate of the camera pose.

In some embodiments, the calculation of the camera pose may be based on the depth maps. An Iterative Closest Point algorithm (ICP) can be applied to successive depth maps captured by the camera, to align two sets of point clouds and compute the transformation between them. Assuming the two point cloud sets represent static scenes, the computed transformation describes the movement of the camera that captured the two point cloud sets. By computing the camera transformation describing successive point cloud frames, the global camera pose for each frame can be computed, and the associated point clouds can be accumulated (by depth pixel accumulation circuit 306) into a single data structure representing the 3D reconstruction of the entire scene. Moreover, each point in the scene is sampled multiple times, and consequently, a weighted average of their 3D positions can be computed, generating a higher quality 3D reconstruction of the scene. Furthermore, the segmentation techniques described below, which rely on depth data, may operate directly on the depth maps provided by the camera or on the 3D reconstruction based on aligning successive depth frames and averaging the 3D positions of the accumulated points. In some embodiments, the camera pose may be estimated using other known techniques in light of the present disclosure.

Figure 5:
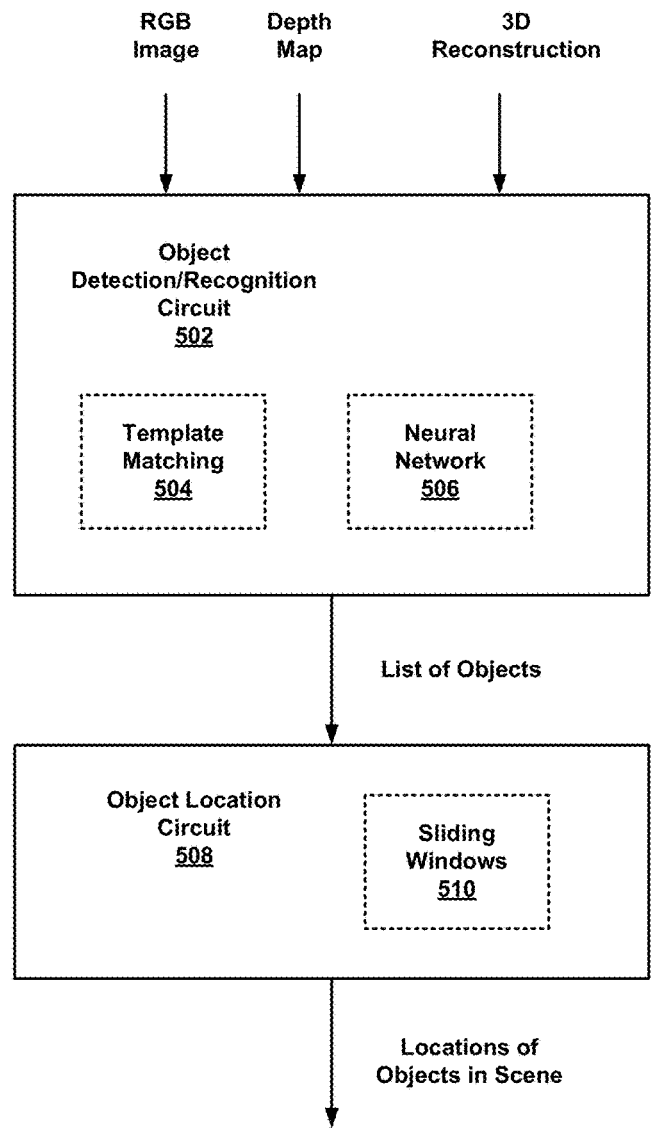
FIG. 5 is a more detailed block diagram of an object detection circuit, configured in accordance with certain of the embodiments disclosed herein.

The camera pose calculation circuit 302 determines the 3D position of the camera at each frame, in a global coordinate system. Consequently, 3D points extracted from the associated depth maps can also be transformed or projected to this coordinate system. Thus, computation of the camera pose for each frame allows for integration of the depth maps obtained at different times into a single 3D space. Each camera frame also includes an RGB image, which may similarly be associated with the 6DOF camera pose FIG. 5 is a more detailed block diagram of an object detection circuit 134, configured in accordance with certain of the embodiments disclosed herein. The object detection circuit is shown to include an object detection/recognition circuit 504 and an object location circuit 508.

Figure 6:
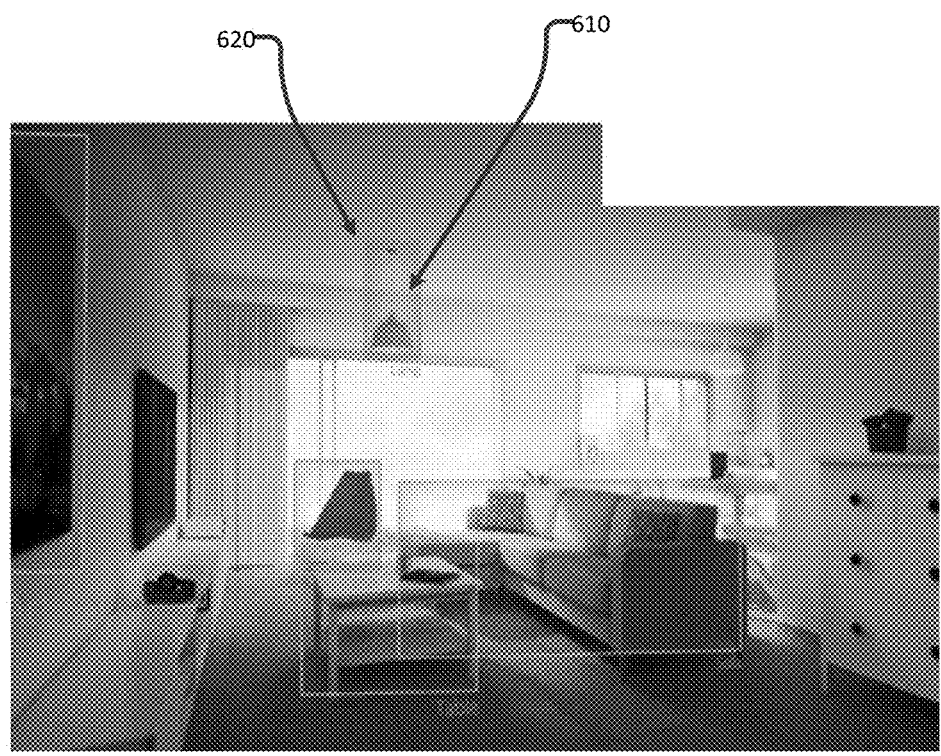
FIG. 6 illustrates an example of detected objects in a 3D image, in accordance with certain of the embodiments disclosed herein.

The object detection/recognition circuit 504 may be configured to process the RGB image, and in some embodiments the associated depth map as well, along with the 3D reconstruction, to generate a list of any objects of interest recognized in the image. The object location circuit 508 may be configured to determine an associated location of each object in the scene. Any suitable object detection technique may be used in to recognize the objects in the scene, and compute their locations in the image including, for example, template matching 504 or classification using a bag-of-words vision model. In some embodiments, deep learning methods, and, in particular, convolutional neural networks 506 are employed by the detection circuit 502. Some neural network methods process an image as input and calculate a probability that a given object is present in the image. The 3D Reconstruction or the depth maps may also be used as additional channels in a deep convolutional network for the purpose of the object recognition and detection. Determination of the location of the object in the image may be accomplished using sliding windows 510 that can be applied progressively over the image, cropping smaller regions of the image and applying the network to each window. Other techniques for object location first filter out and reject those windows that are unlikely to contain objects. Importantly, these methods are generally invariant to viewing angles so that the same object, and its corresponding 2D location, can be detected from multiple camera poses FIG. 6 illustrates an example of detected objects in a 3D image, in accordance with certain of the embodiments disclosed herein. The detected and recognized objects in an RGB image of the scene, associated with one camera pose, are shown including for example the lamp 610.

Figure 7:
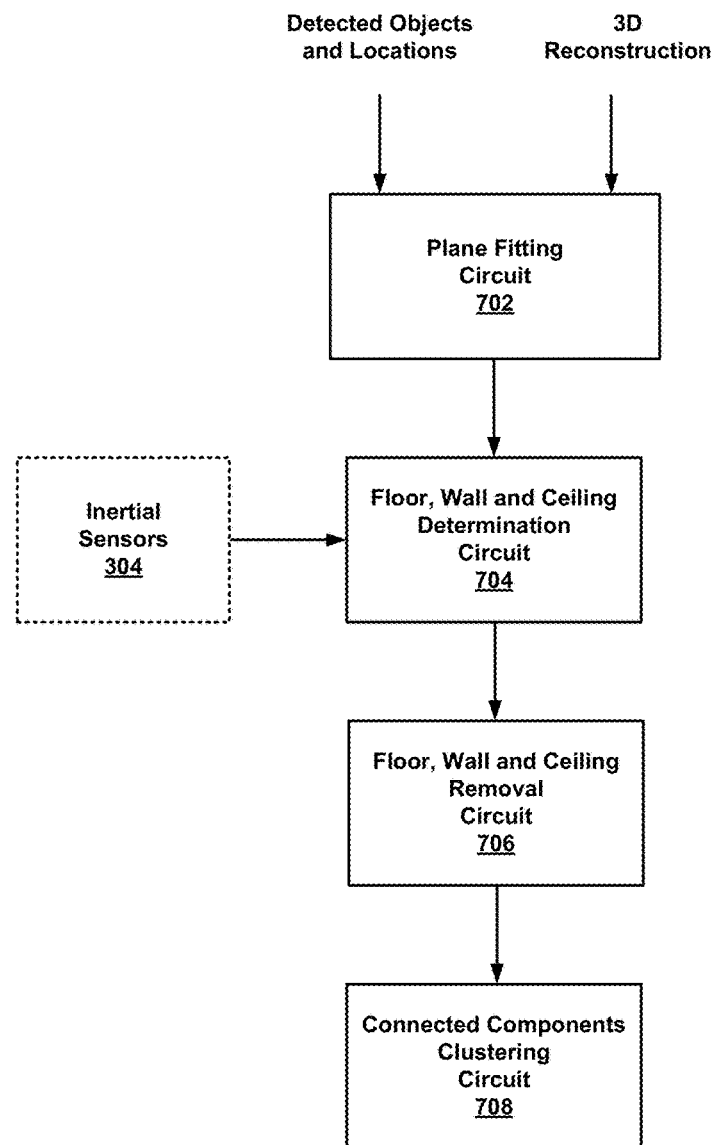
FIG. 7 is a more detailed block diagram of a 3D segmentation circuit, configured in accordance with certain of the embodiments disclosed herein.

FIG. 7 is a more detailed block diagram of a 3D segmentation circuit 136, configured in accordance with certain of the embodiments disclosed herein. The segmentation circuit is shown to include a plane fitting circuit 702, a floor/wall/ceiling determination circuit 704, a floor/wall/ceiling removal circuit 706, and a connected components clustering circuit 708. The 3D segmentation circuit may be configured to segment out each of the objects detected, finding the points of the 3D reconstruction that correspond to the contours of the objects.

The plane fitting circuit 702 may be configured to scan the 3D reconstruction of the scene for planar surfaces. One method to accomplish this is to calculate normal vectors to the surfaces by scanning the depth maps and calculating the cross product of differences of neighboring depth pixels. The normal vectors are then clustered into groups based on spatial proximity and the values of the vectors. Next, a plane is fitted to each cluster. Specifically, the equation for the plane, in an x, y, z coordinate system, may be expressed as:

$$ax+by+cz+d=0$$

where the constants a, b, c, d which define the plane may be calculated by a least-squares fit or other known techniques in light of the present disclosure.

Floor/wall/ceiling determination circuit 704 may be configured to identify floors, walls and ceilings from the list of planes detected in the scene. In some embodiments, a gyroscope inertial sensor 304 is employed to detect the direction of gravity during scanning, and this data is stored during the scanning process. The direction of gravity may then be used to find the plane corresponding to the floor. Next, planar surfaces that are perpendicular to the floor plane (within a margin of error) and cover a sufficiently large region of the scene are identified as walls. Planar surfaces that are perpendicular to the walls and/or parallel to the floor and cover a sufficiently large region of the scene are identified as the ceiling. Floor/wall/ceiling removal circuit 706 may be configured to remove points that are located within a relatively small distance from one of these planar surfaces from the scene. Connected components clustering circuit 708 may be configured to generate clusters of pixels that are not connected to other regions and classify them as individual, segmented objects of the scene.

Figure 8:
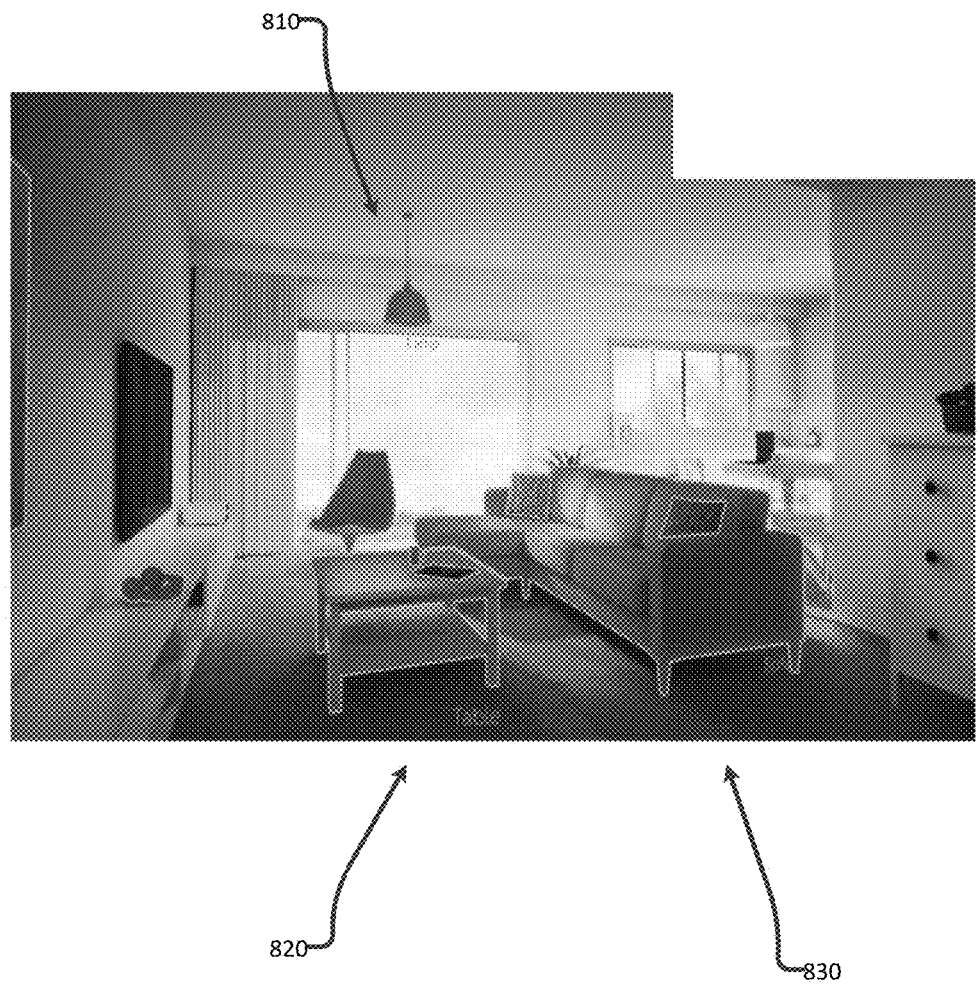
FIG. 8 illustrates an example of segmented objects in a 3D image, in accordance with certain of the embodiments disclosed herein.

FIG. 8 illustrates an example of segmented objects in a 3D image, in accordance with certain of the embodiments disclosed herein. Here, the same furnished room is shown as in FIG. 2, but the detected objects (e.g., lamp 810, table 820, sofa 830, etc.) have been marked with boundaries (in blue) to represent the result of the segmentation process described herein. More specifically, the segmentation process generates, for each object of interest, a collection of 3D points, referred to as an object boundary set, representing the 3D boundary or contour of the object of interest.

Figure 9:
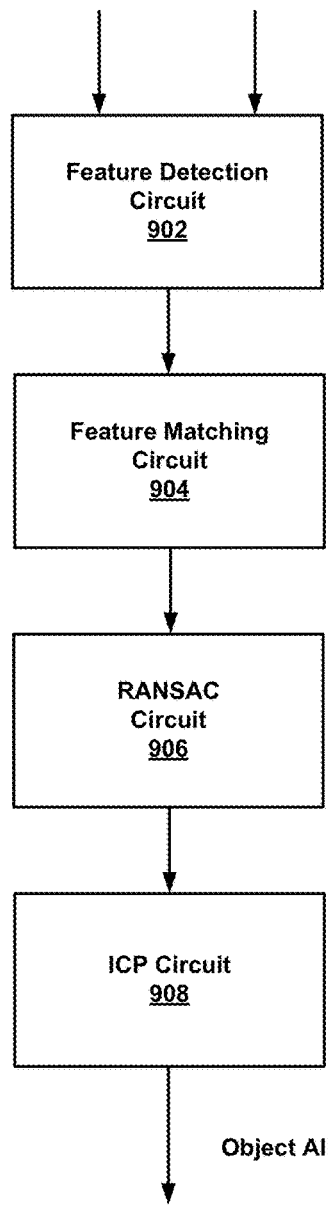
FIG. 9 is a more detailed block diagram of a 3D registration circuit, configured in accordance with certain of the embodiments disclosed herein.

FIG. 9 is a more detailed block diagram of a 3D registration circuit 138, configured in accordance with certain of the embodiments disclosed herein. The registration circuit is shown to include a feature detection circuit 902, a feature matching circuit 904, a Random Sample Consensus (RANSAC) circuit 906 and an Iterative Closest Point (ICP) matching circuit 908. The 3D registration circuit 138 may be configured to operate on each of the detected objects in the scene, along with the associated segmented region, to obtain a 3D alignment of the object in the scene. In particular, a 3D transformation is computed to align the detected object to a source object, such as, for example a CAD model of the object. In some embodiments, the source object may be created by scanning the object with a depth camera and applying 3D scanning software to produce a 3D reconstruction of the object.

Feature detection circuit 902 may be configured to detect features in both the detected/segmented objects and the source objects (models). These features may include, for example, 3D corners or any other suitable distinctive features of the object. In some embodiments, the RGB image frames are stored and mapped to the 3D reconstruction, enabling the use of 2D feature detection techniques such as Scale Invariant Feature Transform (SIFT) detection and Speeded-Up Robust Feature (SURF) detection. Feature matching circuit 904 may be configured to match a subset of at least 3 pairs of features from the detected and source objects to each other. These 3 matches are used to generate a 3D transformation that aligns the detected and source objects. Because some of the matches may be incorrect, and the object data set may be noisy and/or missing some points, the RANSAC circuit 906 may be configured to iteratively improve the 3D transformation alignment. An approximate 3D transformation, generated by the RANSAC circuit 906 is applied to the source object, and the Iterative Closest Point (ICP) circuit 908 may be configured to further improve or refine the computation of the 3D transformation.

Figure 10:
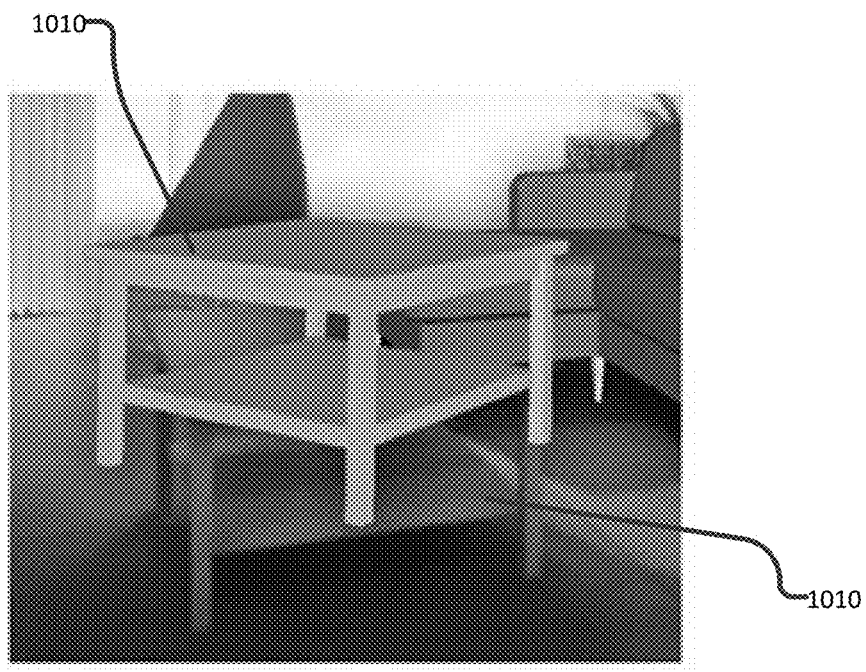
FIG. 10 illustrates an example of a 3D registration of an object, in accordance with certain of the embodiments disclosed herein.

FIG. 10 illustrates an example 1000 of a 3D registration of an object, in accordance with certain of the embodiments disclosed herein. A model of a coffee table 1010 is shown at a point in progress during alignment with the coffee table 1010 of the scene in FIG. 2.

Figure 11:
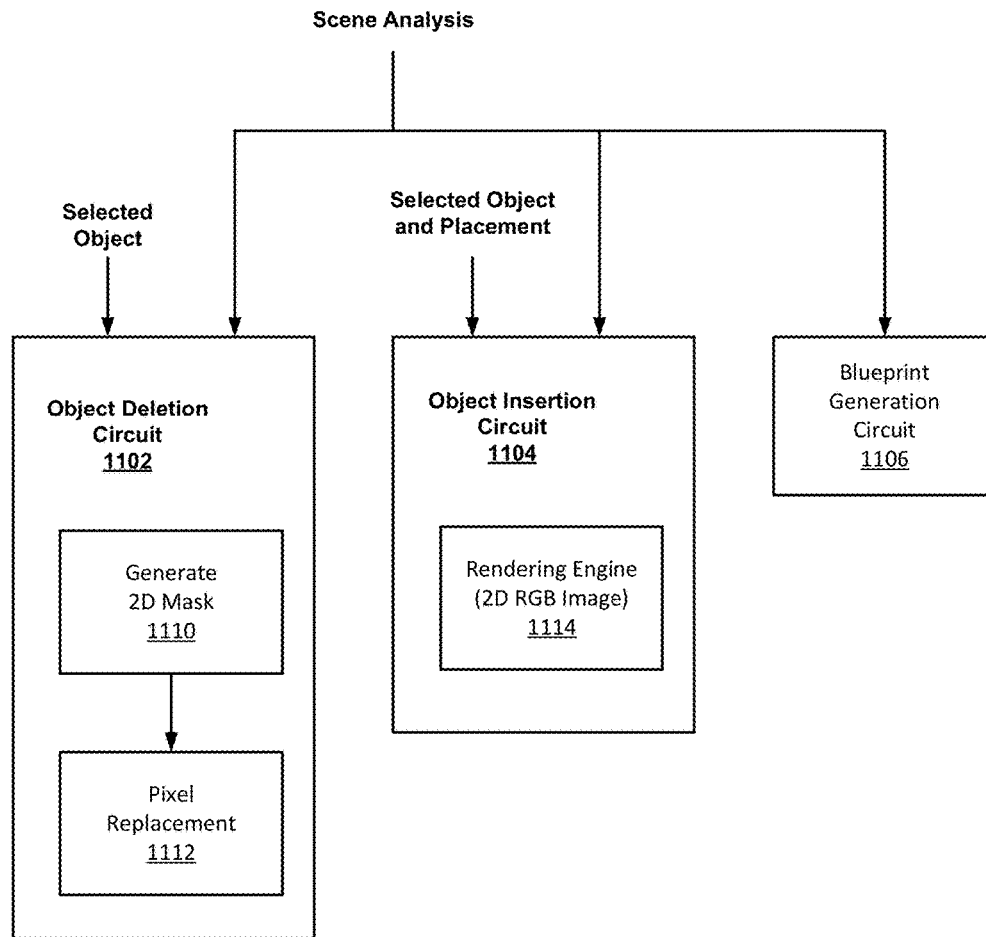
FIG. 11 is a more detailed block diagram of an augmented reality manipulation circuit, configured in accordance with certain of the embodiments disclosed herein.

FIG. 11 is a more detailed block diagram of an augmented reality (AR) manipulation circuit 140, configured in accordance with certain of the embodiments disclosed herein. AR manipulation circuit 140 is shown to include an object deletion circuit 1102, an object insertion circuit 1104 and a blueprint generation circuit 1106, the operations of which will be explained in detail below.

Figure 12:
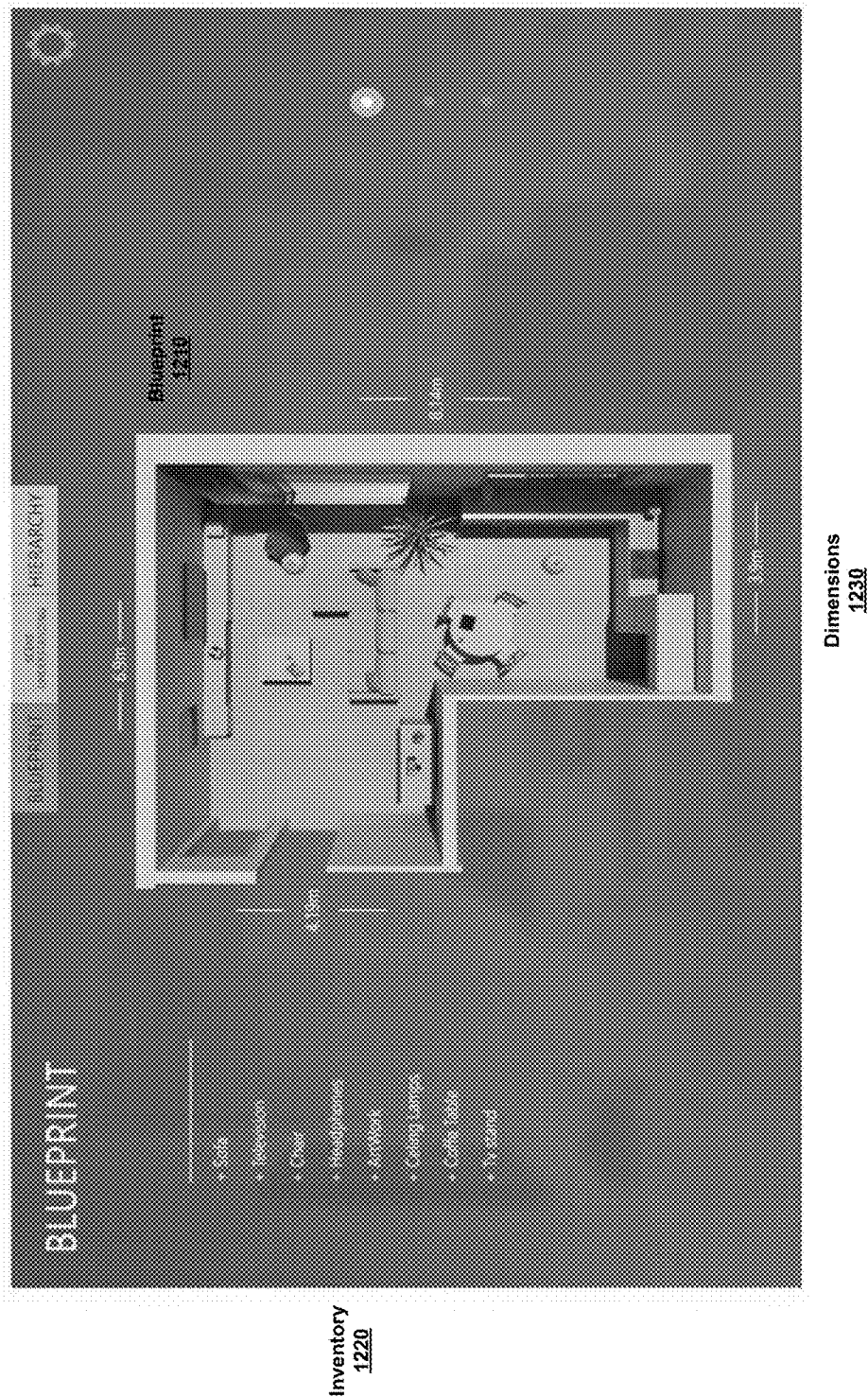
FIG. 12 illustrates an example of a generated blueprint of a scene, in accordance with certain of the embodiments disclosed herein.

As the 3D Registration circuit 138 is applied to each pair of segmented cluster of 3D points and associated detected object, an improved analytical "understanding" of the scene becomes known. This scene analysis includes knowledge of the 3D orientation and position of each object in the scene, and knowledge of the mapping of the 3D points associated with each object to the appropriate source model. Such understanding of the scene enables the implementation of various end-user applications. For example, in some embodiments, blueprint generation circuit 1106 may be configured to generate a blueprint 1210, as illustrated in FIG. 12, of the scene shown in FIG. 2, based on the scene analysis. Additionally, an inventory 1220 of the objects detected in the scene, as well as measurements of the dimensions of the rooms (and/or objects) 1230, may also be generated.

In some embodiments, the AR manipulation circuit 140 may be configured to allow a user to select one or more objects of interest in the scene to be deleted or to be replaced by a virtual object. For example, the user may be presented with a list of the detected objects and allowed to make selections including deletion, replacement or insertion of new objects into the scene. In some embodiments, the user may be given the option to select objects from a catalog of virtual objects for insertion or replacement into the scene. In the case of replacement, the user may be prompted to place the selected virtual object at the center of the 3D position which the deleted object previously occupied. Alternatively, if the user selects a virtual object to be inserted, manipulation controls may be provided to enable the user to place the virtual object in the scene at the desired location. The process may be repeated as many times as the user desires.

Object deletion circuit 1102 may be configured to delete user selected objects from the scene. For each object to be deleted from the scene, a rendering engine generates a 2D mask 1110 based on the camera pose and the registration of the 3D model of the object to be deleted. The 2D mask is transparent, except for the pixels corresponding to the object of interest. The values of these pixels may be sampled from the surrounding texture, or an in-filling algorithm may be used to assign values to the pixels consistent with the surrounding pixels in the RGB image of the scene. The mask is overlaid (pixel replacement 1112) onto the RGB image captured at the current image frame of the camera and displayed to the user, effectively deleting the selected object from the displayed image.

Object insertion circuit 1104 may be configured to insert virtual objects into the scene, super-imposed onto the user's view, in a relatively seamless manner. A rendering engine 114 takes as input the calculated camera pose of the current scene, a 3D model of the virtual object to be inserted, a lighting model, the plane of the floor, and the camera operational parameters (e.g., focal length, principal axis) and renders a 2D RGB image of the virtual object to be super-imposed onto the RGB image of the current frame and displayed to the user. In some embodiments, the depth map may also be used to further augment the scene, by considering occlusions between objects, or by rendering shadows, color bleed and reflections.

The overall effect, as presented to the user, for example on display element 112, is that of the selected deleted object(s) being removed from the scene and the selected virtual object(s) being inserted into the scene. The described process may be repeated for each frame generated by the depth camera, so that as the user moves the depth camera, which may be integrated in a tablet, around the scene, the camera pose and the masks generated for each frame are continuously recomputed and super-imposed on the current frame from the camera, in order to maintain the realistic effect. In a similar manner, walls in the scene can be treated as objects, to be deleted and replaced by a wall at a different location in the scene (e.g., further away), or of a different color. Additionally, in some embodiments, virtual characters, for example as in a game, can be rendered and inserted into each frame, in real-time. Furthermore, text and graphic displays may also be overlaid onto the scene, for example, to guide the user, measure object sizes, etc.

In general, RGB and depth images may be captured in real-time from the camera and the scene analysis techniques described herein may be applied successively on each capture or on combinations of previous captures. The system may be configured to execute on a tablet platform in real-time, so as to provide the user with live feedback on how well the system has been able to analyze or understand the scene. This feedback may be provided, for example, through display element 112. If there is insufficient data, some components of the system may be unable to perform their tasks in an adequate manner. For example, if a clear view of an object is unavailable, the object detection circuit 134 may fail to detect an object in the scene. Similarly, if only partial views of an object have been captured by the camera, the 3D registration circuit 138 may be unable to align the source model to the detected object. In some embodiments, therefore, a user assistance application may execute on the platform to aid the user and the process, by indicating which objects have been successfully analyzed. In this way, the user is directed to provide additional information to the system, by changing the view of the camera to provide missing data.

In some embodiments, the scene may first be scanned and frame images stored for subsequent processing by the scene analysis system. Alternatively, some operations of the scene analysis system may be performed in real-time and others as a post-process. For example, the 3D reconstruction and the object detection may be performed in real-time, while the remaining 3D segmentation, and 3D registration may be performed as a post-processing operation.

Methodology

Figure 13:
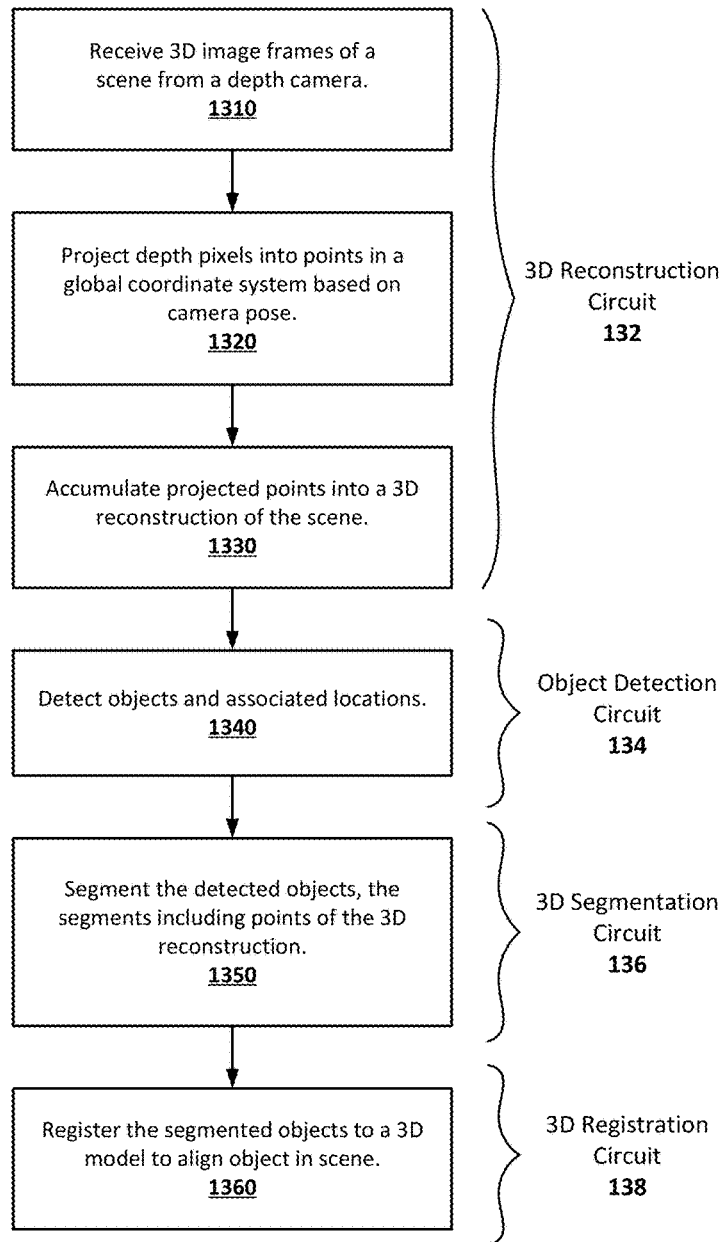
FIG. 13 is a flowchart illustrating a methodology for 3D scene analysis, in accordance with certain of the embodiments disclosed herein.

FIG. 13 is a flowchart illustrating an example method 1300 for 3D scene analysis and augmented reality operations, in accordance with an embodiment of the present disclosure. As can be seen, example method 1000 includes a number of phases and sub-processes, the sequence of which may vary from one embodiment to another. However, when considered in the aggregate, these phases and sub-processes form a process for 3D scene analysis and AR operations in accordance with certain of the embodiments disclosed herein. These embodiments can be implemented, for example using the system architecture illustrated in the Figures, as described herein. However other system architectures can be used in other embodiments, as will be apparent in light of this disclosure. To this end, the correlation of the various functions shown in FIG. 13 to the specific components illustrated in the other Figures is not intended to imply any structural and/or use limitations. Rather other embodiments may include, for example, varying degrees of integration wherein multiple functionalities are effectively performed by one system. For example, in an alternative embodiment a single module can be used to perform all of the functions of method 1300. Thus other embodiments may have fewer or more modules and/or sub-modules depending on the granularity of implementation. Numerous variations and alternative configurations will be apparent in light of this disclosure.

As illustrated in FIG. 13, in one embodiment, method 1300 for 3D scene analysis and AR operations commences by receiving, at operation 1310, a series of 3D image frames, for example from a depth camera, of a scene containing one or more objects as the camera scans the scene. Each frame may thus provide a new view of the scene from a different perspective or camera pose. Each frame provided by the depth camera may include a color image frame comprising color (RGB) pixels and a depth map frame comprising depth pixels. Next, at operation 1320, the depth pixels are projected into points in a global coordinate system based on the camera pose, and at operation 1330, the projected points are accumulated into a 3D reconstruction of the scene.

At operation 1340, objects within the scene are detected and located for each 3D image frame, based on the camera pose, the 3D reconstruction, the RGB image frame and the depth map frame. At operation 1350, each of the detected objects in the scene is segmented. The segments comprise the points of the 3D reconstruction corresponding to contours of the associated detected object. At operation 1360, the segmented objects are registered to a 3D model of the object to determine an alignment of the object in the scene.

Of course, in some embodiments, additional operations may be performed, as previously described in connection with the system. These additional operations may include, for example, deleting a selected object from the scene and replacing background pixels for the deleted object and/or adding a new object to the scene, wherein both augmented reality operations are based on the scene analysis. Further additional operations may include, for example, generating a blueprint of the scene based on the registered objects and the associated locations of the objects.

Alternative Segmentation Methodology

Figure 14:
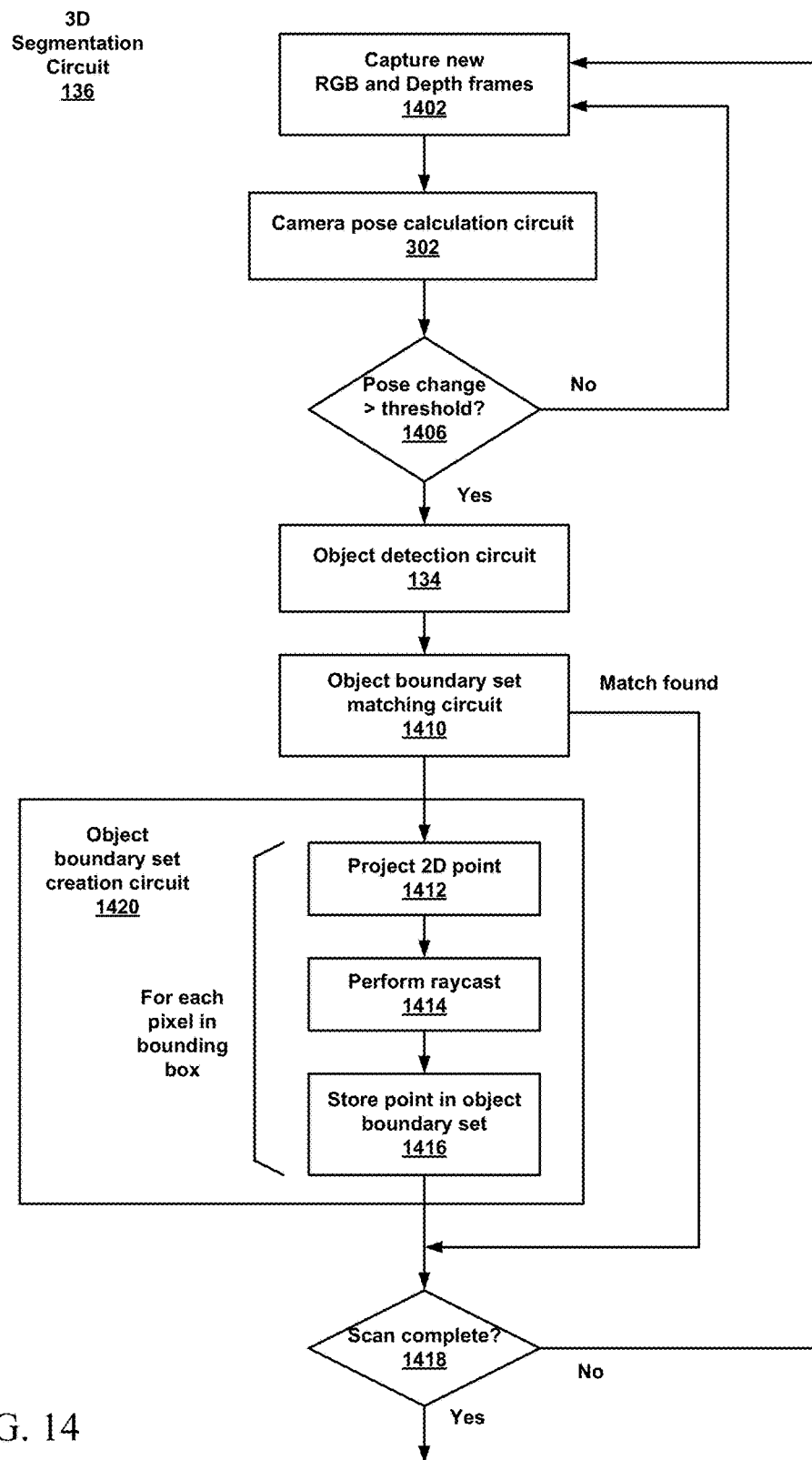
FIG. 14 is another detailed block diagram of a 3D segmentation circuit, configured in accordance with certain of the embodiments disclosed herein.

FIG. 14 is a detailed block diagram of another embodiment of 3D segmentation circuit 136. The segmentation circuit 136 is shown to include the camera pose calculation circuit 302 and object detection circuit 134 as previously described, as well as an object boundary set matching circuit 1410 and an object boundary set creation circuit 1420.

As new RGB and depth frames of the scene 120 are captured by depth camera 110, at operation 1402, they are provided to the camera pose calculation circuit 302. The camera pose calculation circuit 302 may be configured to compute and update the position and orientation (or pose) of the camera as previously described.

Camera motion, as the scene is scanned, may be relatively slow such that there could be significant overlap between successive RGB images. At operation 1406, if the change in camera pose does not exceed a threshold value, processing of the RGB frame may not be justified and the system will wait for a subsequent frame capture. The threshold value may be set based on the processing capabilities of the system and/or the expected speed of the camera scanning motion.

The object detection circuit 134 may be configured to process the RGB image, and in some embodiments the associated depth map as well, to generate a list of any objects of interest recognized in the image. A label may be attached to each of the recognized objects and a 2D bounding box is generated which contains the object. Additionally, a 3D location of the center of the 2D bounding box is computed. Referring back to FIG. 6 examples are illustrated of 2D bounding boxes applied to recognized objects in an RGB image of the scene associated with one camera pose. For example, the object recognized and labeled as a lamp 610 is contained within a boundary box 620. Any suitable object detection technique may be used in to recognize the objects in the scene, and compute their locations in the image as previously described.

The object boundary set matching circuit 1410 may be configured to find an appropriate existing object boundary set that matches each of the detected objects, if possible. The matching is based on a comparison of the object label and/or the 3D location of the center of the 2D bounding box, between the detected object and each of the existing object boundary sets, if any. A comparison threshold may be used to account for the fact that the estimated center of the 2D bounding boxes corresponding to the same object may vary somewhat when captured from different camera perspectives.

Figure 15:
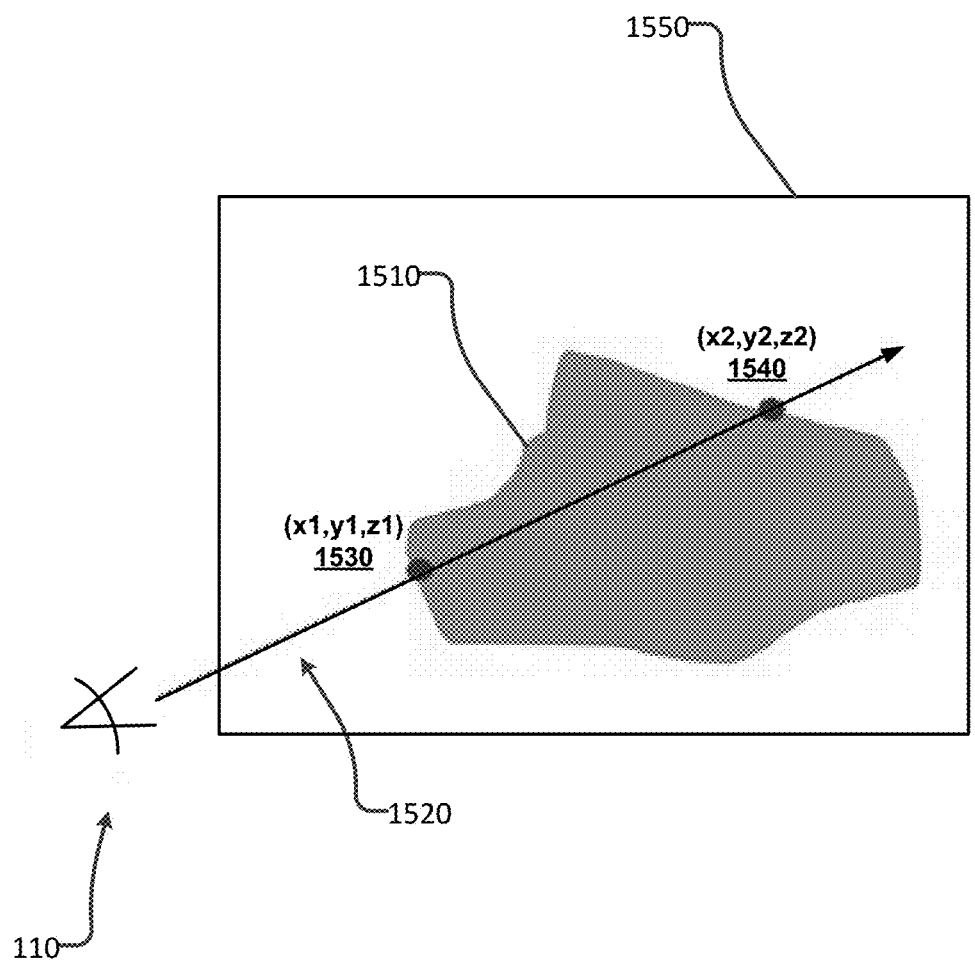
FIG. 15 illustrates an example position and ray associated with pixels in an object boundary set, in accordance with certain of the embodiments disclosed herein.

The object boundary set creation circuit 1420 may be configured to create a new object boundary set if a suitable match for the detected object is not found by the object boundary set matching circuit 1410. For each unmatched detected object of interest, the 2D bounding box containing the object is scanned to analyze each pixel within the bounding box. For each pixel, the associated 3D position of the 2D pixel is computed, by sampling the associated depth map to obtain the associated depth pixel and projecting that depth pixel to a point in 3D space, at operation 1412. A ray is then generated which extends from the camera to the location of the projected point in 3D space at operation 1414. The point at this 3D position is included in the object boundary set at operation 1416. In order to represent this point in the object boundary set, two 3-element vectors are stored: the 3D (x,y,z) position of the point in the global coordinate system, and the vector representing the ray extending from the camera's position to that point (which is referred to herein as the "camera ray"). FIG. 15 illustrates this in a top-down view, showing the position of the camera 110 in a given pose along with the object 1510, which is contained in the 2D bounding box 1550. Two example pixel points are also shown, 1530 and 1540, along with the ray 1520 that extends from the camera to the intersection with each pixel point on the boundary of the object. After processing each pixel in the 2D bounding box, the image capture continues, at a new camera pose, until the scan of the scene is complete, operation 1418.

When the scanning of the scene is completed, there is a single object boundary set for each object detected in the scene. Each object boundary set contains the aggregate of all points projected from pixels in the 2D bounding box of the object, as captured from multiple camera perspectives. The object boundary set may then be further processed to remove multiple samples of the same point (as seen from different camera perspectives), and to remove incorrect points (not belonging to the object of interest) that were included in the bounding box due, for example to the presence of other objects occluding the view of the object of interest.

Figure 16:
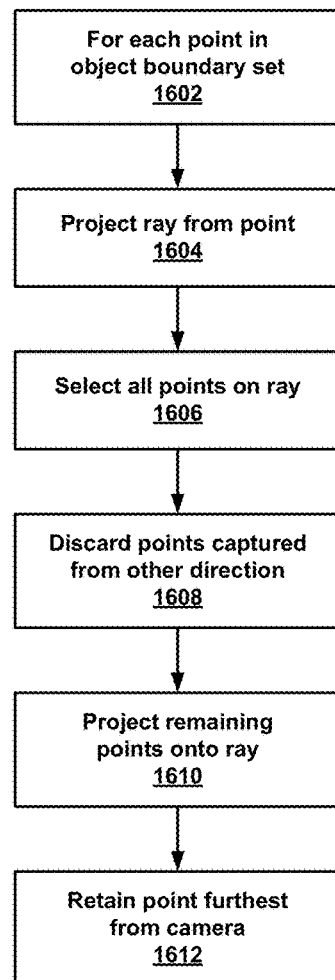
FIG. 16 is a flowchart illustrating a methodology for boundary adjustment, in accordance with certain of the embodiments disclosed herein.

FIG. 16 is a flowchart 1600 illustrating a methodology for boundary adjustment, in accordance with certain of the embodiments disclosed herein. Boundary adjustment circuit 1600 may be configured to implement this methodology to improve the estimated boundary of the detected objects by removing, from each object boundary set, duplicate pixels and pixels associated with other objects occluding the camera's view of the object of interest. At operation 1602, each point P in the object boundary set is considered, and a ray is projected, at operation 1604, from the point P in the direction of the camera ray that was previously stored for that point. This ray is referred to herein as the "point ray." Next, at operation 1606, all points in the object boundary set are analyzed with respect to the current point P, and any point lying close enough to the point ray (within a given threshold distance) is selected. This set of selected points is referred to as "set A," and the points in set A are considered to be lying on the point ray.

For each of the points in set A, the associated camera ray is extracted and compared to the point ray of the current point P. If the camera ray is opposite in direction to that of the current point ray, then that point, associated with the camera ray, is discarded from set A, at operation 1608. To determine whether the camera ray and point ray are in opposite directions, a dot product of the two rays may be computed. The value of this dot product will be negative if the directions of the two rays differ by more than 90 degrees. Thus, if the dot product is negative, the point from set A was likely captured by the camera when viewing the opposite side of the object, and it is ignored for further consideration with respect to point P. In other words, the point discarded from set A is no longer a candidate for removal from the object boundary set since, being on the other side of the object it is not a duplicate of point P.

After each point in set A has been similarly processed, to eliminate points on the opposite side of the object from consideration for removal, the remaining points of set A are assumed to have been captured from the same general view of the object, and only one will be kept in the object boundary set. To decide which point to keep, at operation 1610 all remaining points of set A are projected onto the point ray. The point in set A that is furthest away from point P, in the direction of the point ray, is selected, at operation 1612, and the rest of the points are discarded from the object boundary set. Any point in set A with a negative position on the point ray (that is, lying in the direction opposite that of the point ray) is also discarded. Note point P may also be discarded from the object boundary set in this stage. By retaining the point which is furthest away from point P (along the direction of P's point ray), point associated with occluding objects will be discarded, since, by definition, the occluding object will be closer to the camera than the object of interest.

Figure 17A:
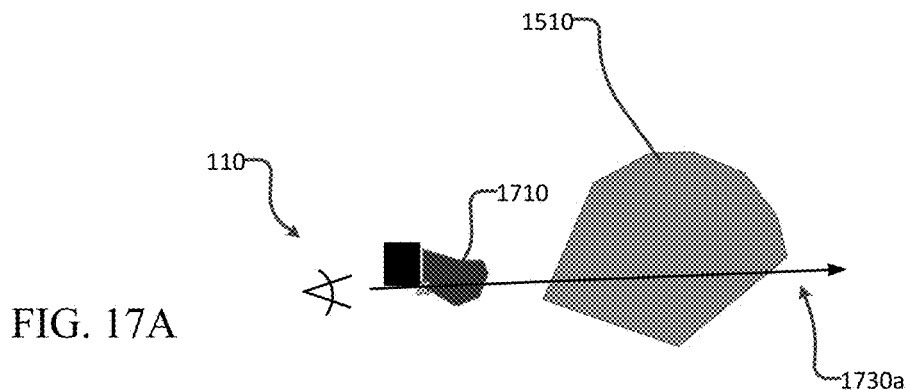
FIGS. 17A, 17B, 17C and 17D illustrate examples of rays used for boundary adjustments, in accordance with certain of the embodiments disclosed herein.
Figure 17B:
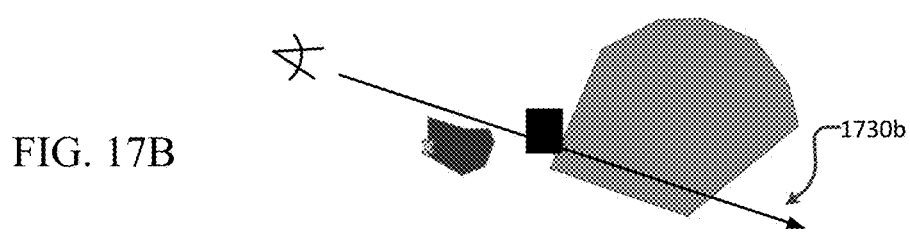
Figure 17C:
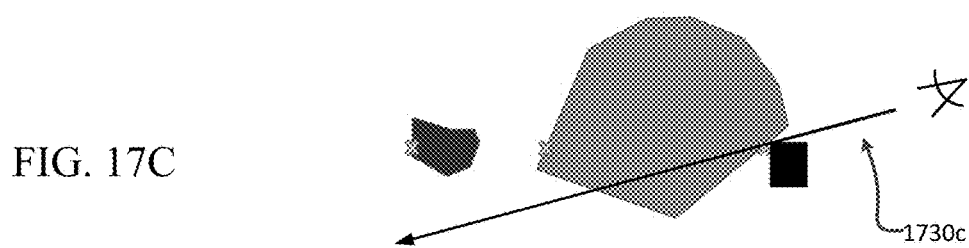
Figure 17D:
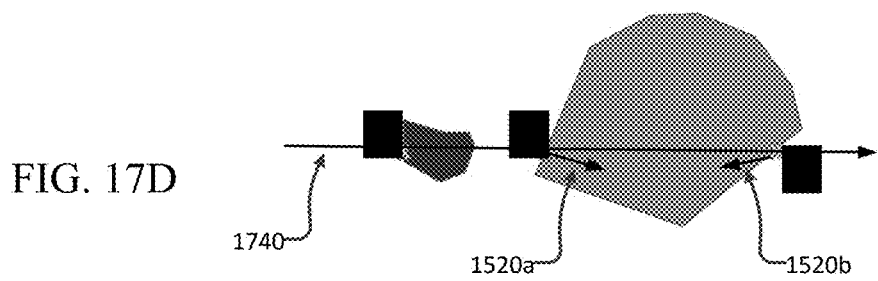

FIGS. 17A, 17B, 17C and 17D illustrate examples of rays used for boundary adjustments, in accordance with certain of the embodiments disclosed herein. In FIG. 17A, the camera 110 is shown viewing the object of interest 1510 from a first perspective or pose described by camera ray 1730a. An occluding object 1710 blocks the camera's view from this perspective and point number 1 may thus be included in the object boundary set. In FIG. 17B, the camera's perspective has changed as the scene is scanned and a new camera ray 1730b avoids the occluding object 1710. Point number 2 may thus be added to the object boundary set. In FIG. 17C, the camera's perspective has changed again and a new camera ray 1730c provides a view of the opposite side of object 1510. Point number 3 may thus be added to the object boundary set. In FIG. 17D, the object boundary set adjustment is illustrated with respect to point 1 being chosen as point P, using the terminology established above, with a corresponding point ray 1740. Points 2 and 3 are selected form the object boundary set for inclusion in set A because they lie close enough to the point ray 1740. Point 3 is eliminated from consideration for removal because its camera ray 1520b is in the opposite direction from point ray 1740 (because it is on the opposite side of the object with respect to point P). Point 2 is retained in the object boundary set because it is furthest away from point P (and is correctly associated with the object of interest rather than the occluding object). Point 1 is thus removed from the object boundary set since point 2 was retained.

Figure 18:
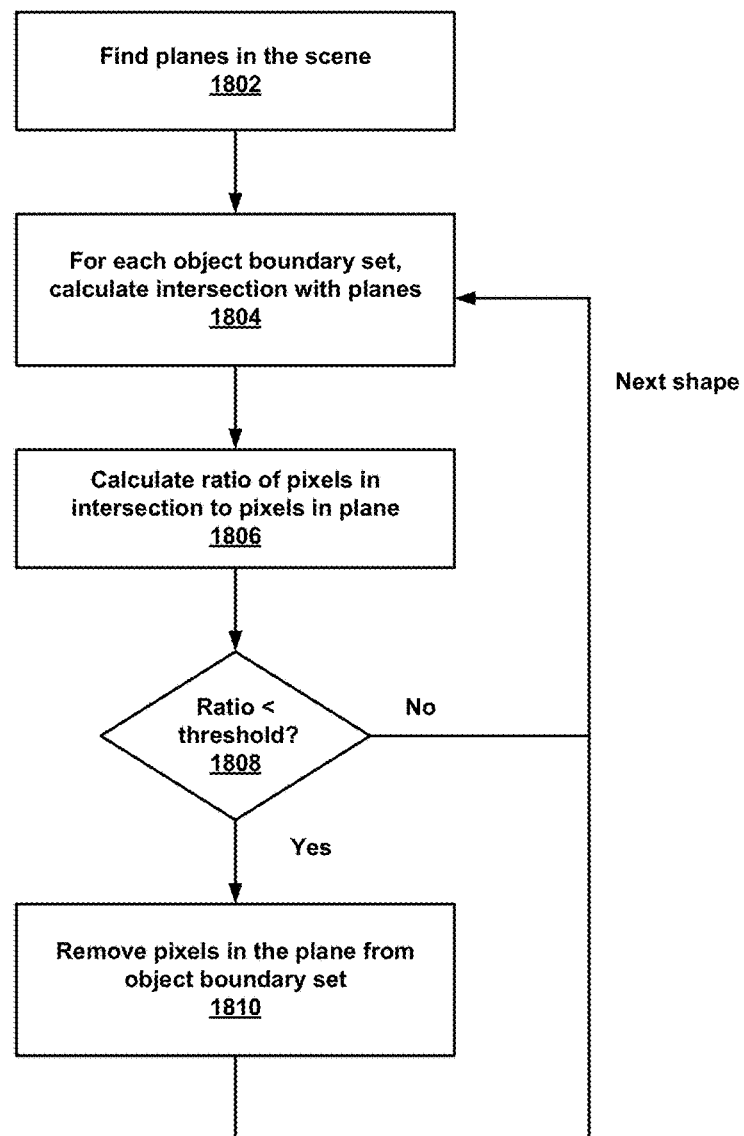
FIG. 18 is a flowchart illustrating a methodology for surface plane removal, in accordance with certain of the embodiments disclosed herein.

FIG. 18 is a flowchart illustrating a methodology for surface plane removal, in accordance with certain of the embodiments disclosed herein. Surface plane removal circuit 1800 may be configured to implement this methodology to improve the estimated boundary of the detected objects by removing surface planes upon which the objects may be positioned. It may be common for objects of interest to be resting on a planar surface, such as the floor, table shelves, etc. As a result, it is likely that points from the surface might be erroneously included in the boundary shape. In some embodiments, therefore, a post-processing operation is implemented in which such surface planes are detected, and removed from the 3D segmentation results.

At operation 1802, a plane fitting algorithm is applied to the entire scene, in order to detect the planes contained within the scene, as previously described in connection with plane fitting circuit 702. Next, at operation 1804, the object boundary sets are scanned against the list of planar surfaces, to check for intersections. For each object boundary set, the subset of intersecting points is computed. The size of this intersection relative to the size of the entire planar surface is evaluated at operation 1806 and may be expressed as a ratio. If the planar surface extends beyond the boundaries of the object, it is reasonable to assume that it represents a surface supporting the object of interest, and its pixels should be excluded from the object boundary set. In some embodiments, a value of 90% may be used as a threshold for the ratio (operation 1808). That is, if the intersection set contains less than 90% of the pixels that are contained by the planar surface, then all the pixels of the planar surface are excluded from the object boundary set, at operation 1810. Otherwise, the object boundary set is preserved as is, and the next detected object boundary set is evaluated.

Example System

Figure 19:
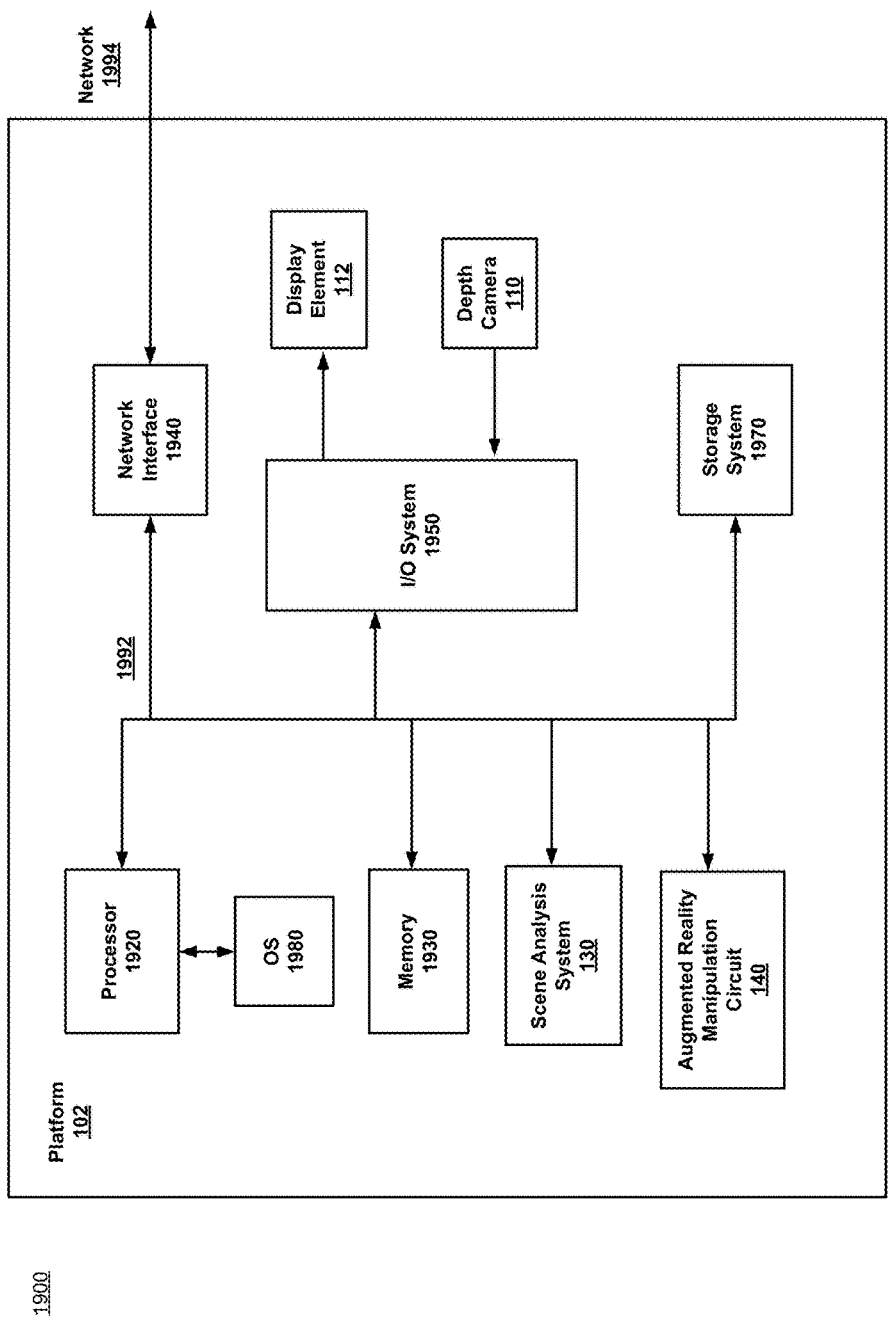
FIG. 19 is a block diagram schematically illustrating a system platform for 3D scene analysis, configured in accordance with certain of the embodiments disclosed herein.

FIG. 19 illustrates an example system 1900 that may be configured to segment objects from a 3D image of a scene, for example based on object recognition, as described herein. In some embodiments, system 1900 comprises a platform 102 which may host, or otherwise be incorporated into a personal computer, workstation, laptop computer, ultra-laptop computer, tablet, touchpad, portable computer, handheld computer, palmtop computer, personal digital assistant (PDA), cellular telephone, combination cellular telephone and PDA, smart device (for example, smartphone or smart tablet), mobile internet device (MID), and so forth. Any combination of different devices may be used in certain embodiments.

In some embodiments, platform 102 may comprise any combination of a processor 1920, a memory 1930, a scene analysis system 130, an AR manipulation circuit 140, a depth camera 110, a network interface 1940, an input/output (I/O) system 1950, a display element 112, and a storage system 1970. As can be further seen, a bus and/or interconnect 1992 is also provided to allow for communication between the various components listed above and/or other components not shown. Platform 102 can be coupled to a network 1994 through network interface 1940 to allow for communications with other computing devices, platforms or resources. Other componentry and functionality not reflected in the block diagram of FIG. 19 will be apparent in light of this disclosure, and it will be appreciated that other embodiments are not limited to any particular hardware configuration.

Processor 1920 can be any suitable processor, and may include one or more coprocessors or controllers, such as an audio processor or a graphics processing unit, to assist in control and processing operations associated with system 1900. In some embodiments, the processor 1920 may be implemented as any number of processor cores. The processor (or processor cores) may be any type or combination of processor, such as, for example, a micro-processor, an embedded processor, a digital signal processor (DSP), a graphics processor (GPU), a network processor, a field programmable gate array or other device configured to execute code. The processors may be multithreaded cores in that they may include more than one hardware thread context (or "logical processor") per core. Processor 1920 may be implemented as a complex instruction set computer (CISC) or a reduced instruction set computer (RISC) processor. In some embodiments, processor 1920 may be configured as an x86 instruction set compatible processor.

Memory 1930 can be implemented using any suitable type of digital storage including, for example, flash memory and/or random access memory (RAM). In some embodiments, the memory 1930 may include various layers of memory hierarchy and/or memory caches as are known to those of skill in the art. Memory 1930 may be implemented as a volatile memory device such as, but not limited to, a RAM, dynamic RAM (DRAM), or static RAM (SRAM) device. Storage system 1970 may be implemented as a non-volatile storage device such as, but not limited to, one or more of a hard disk drive (HDD), a solid state drive (SSD), a universal serial bus (USB) drive, an optical disk drive, tape drive, an internal storage device, an attached storage device, flash memory, battery backed-up synchronous DRAM (SDRAM), and/or a network accessible storage device. In some embodiments, storage 1970 may comprise technology to increase the storage performance enhanced protection for valuable digital media when multiple hard drives are included.

Processor 1920 may be configured to execute an Operating System (OS) 1980 which may comprise any suitable operating system, such as Google Android (Google Inc., Mountain View, Calif.), Microsoft Windows (Microsoft Corp., Redmond, Wash.), Linux, or Apple OS X (Apple Inc., Cupertino, Calif.) and/or various real-time operating systems. As will be appreciated in light of this disclosure, the techniques provided herein can be implemented without regard to the particular operating system provided in conjunction with system 1900, and therefore may also be implemented using any suitable existing or subsequently-developed platform.

Network interface module 1940 can be any appropriate network chip or chipset which allows for wired and/or wireless connection between other components of computer system 1900 and/or network 1994, thereby enabling system 1900 to communicate with other local and/or remote computing systems, servers, and/or resources. Wired communication may conform to existing (or yet to developed) standards, such as, for example, Ethernet. Wireless communication may conform to existing (or yet to developed) standards, such as, for example, cellular communications including LTE (Long Term Evolution), Wireless Fidelity (Wi-Fi), Bluetooth, and/or Near Field Communication (NFC). Exemplary wireless networks include, but are not limited to, wireless local area networks, wireless personal area networks, wireless metropolitan area networks, cellular networks, and satellite networks.

I/O system 1950 may be configured to interface between various I/O devices and other components of computer system 1900. I/O devices may include, but not be limited to, a display element 112, depth camera 106, and other devices not shown such as a keyboard, mouse, speaker, microphone, etc.

I/O system 1950 may include a graphics subsystem configured to perform processing of images for display element 112. Graphics subsystem may be a graphics processing unit or a visual processing unit (VPU), for example. An analog or digital interface may be used to communicatively couple graphics subsystem and display element 112. For example, the interface may be any of a high definition multimedia interface (HDMI), DisplayPort, wireless HDMI, and/or any other suitable interface using wireless high definition compliant techniques. In some embodiment, the graphics subsystem could be integrated into processor 1920 or any chipset of platform 102. In some embodiments, display element 112 may comprise any television type monitor or display, including liquid crystal displays (LCDs) and light emitting diode displays (LEDs). Display element 112 may comprise, for example, a computer display screen, touchscreen display, video monitor, television-like device, and/or a television. Display element 112 may be digital and/or analog. Under the control of the OS 1980 (or one or more software applications), platform 102 may display processed images on display element 112. The images may be provided by scene analysis system 130, AR manipulation circuit 140, depth camera 106, or other sources. Camera 106 may be configured to provide color (RGB) and depth images or scans of the scene from which a 3D image segmentation of the object may be generated.

It will be appreciated that in some embodiments, the various components of the system 1900 may be combined or integrated in a system-on-a-chip (SoC) architecture. In some embodiments, the components may be hardware components, firmware components, software components or any suitable combination of hardware, firmware or software.

Scene analysis system 130 is configured to provide 3D analysis of a scene including detection, segmentation and registration of objects within the scene. The segmentation may employ object recognition techniques and may include scanning of the scene by a depth camera to collect 3D images from a number of perspectives or camera poses. AR manipulation circuit 140 is configured to implement augmented reality operations including removal and insertion of objects and the generation of blueprints based on the scene analysis. Scene analysis system 130 and AR manipulation circuit 140 may include any or all of the components illustrated in the Figures and described above. Scene analysis system 130 and AR manipulation circuit 140 can be implemented or otherwise used in conjunction with a variety of suitable software and/or hardware that is coupled to or that otherwise forms a part of system 1900. Scene analysis system 130 and AR manipulation circuit 190 can additionally or alternatively be implemented or otherwise used in conjunction with user I/O devices that are capable of providing information to, and receiving information and commands from, a user. These I/O devices may include display element 112, a textual input device such as a keyboard, and a pointer-based input device such as a mouse. Other input/output devices that may be used in other embodiments include a touchscreen, a touchpad, a speaker, and/or a microphone. Still other input/output devices can be used in other embodiments.

In some embodiments, scene analysis system 130 and AR manipulation circuit 140 may be installed local to system 1900, as shown in the example embodiment of FIG. 19. Alternatively, system 1900 can be implemented in a client-server arrangement (or local and cloud based arrangement) wherein at least some functionality associated with scene analysis system 130 and AR manipulation circuit 140 is provided to system 1900 using an applet, such as a JavaScript applet, or other downloadable module. Such a remotely accessible module or sub-module can be provisioned in real-time in response to a request from a client computing system for access to a given server having resources that are of interest to the user of the client computing system. In such embodiments the server can be local to network 1994 or remotely coupled to network 1994 by one or more other networks and/or communication channels. In some cases access to resources on a given network or computing system may require credentials such as usernames, passwords, and/or compliance with any other suitable security mechanism.

In various embodiments, system 1900 may be implemented as a wireless system, a wired system, or a combination of both. When implemented as a wireless system, system 1900 may include components and interfaces suitable for communicating over a wireless shared media, such as one or more antennae, transmitters, receivers, transceivers, amplifiers, filters, control logic, and so forth. An example of wireless shared media may include portions of a wireless spectrum, such as the radio frequency spectrum and so forth. When implemented as a wired system, system 1900 may include components and interfaces suitable for communicating over wired communications media, such as input/output adapters, physical connectors to connect the input/output adaptor with a corresponding wired communications medium, a network interface card (NIC), disc controller, video controller, audio controller, and so forth. Examples of wired communications media may include a wire, cable metal leads, printed circuit board (PCB), backplane, switch fabric, semiconductor material, twisted pair wire, coaxial cable, fiber optics, and so forth.

Various embodiments may be implemented using hardware elements, software elements, or a combination of both. Examples of hardware elements may include processors, microprocessors, circuits, circuit elements (for example, transistors, resistors, capacitors, inductors, and so forth), integrated circuits, ASICs, programmable logic devices, digital signal processors, FPGAs, logic gates, registers, semiconductor devices, chips, microchips, chipsets, and so forth. Examples of software may include software components, programs, applications, computer programs, application programs, system programs, machine programs, operating system software, middleware, firmware, software modules, routines, subroutines, functions, methods, procedures, software interfaces, application program interfaces, instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power level, heat tolerances, processing cycle budget, input data rates, output data rates, memory resources, data bus speeds, and other design or performance constraints.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still cooperate or interact with each other.

The various embodiments disclosed herein can be implemented in various forms of hardware, software, firmware, and/or special purpose processors. For example in one embodiment at least one non-transitory computer readable storage medium has instructions encoded thereon that, when executed by one or more processors, cause one or more of the methodologies for generating 3D object image variations, disclosed herein, to be implemented. The instructions can be encoded using a suitable programming language, such as C, C++, object oriented C, JavaScript, Visual Basic .NET, Beginner's All-Purpose Symbolic Instruction Code (BASIC), or alternatively, using custom or proprietary instruction sets. The instructions can be provided in the form of one or more computer software applications and/or applets that are tangibly embodied on a memory device, and that can be executed by a computer having any suitable architecture. In one embodiment, the system can be hosted on a given website and implemented, for example, using JavaScript or another suitable browser-based technology. For instance, in certain embodiments, scene analysis system 130 and AR manipulation circuit 140 may operate by leveraging processing resources provided by a remote computer system accessible via network 1994. In other embodiments the functionalities disclosed herein can be incorporated into other software applications, such as image management applications. The computer software applications disclosed herein may include any number of different modules, sub-modules, or other components of distinct functionality, and can provide information to, or receive information from, still other components. These modules can be used, for example, to communicate with input and/or output devices such as a display screen, a touch sensitive surface, a printer, and/or any other suitable device. Other componentry and functionality not reflected in the illustrations will be apparent in light of this disclosure, and it will be appreciated that other embodiments are not limited to any particular hardware or software configuration. Thus in other embodiments system 1900 may comprise additional, fewer, or alternative subcomponents as compared to those included in the example embodiment of FIG. 19.

The aforementioned non-transitory computer readable medium may be any suitable medium for storing digital information, such as a hard drive, a server, a flash memory, and/or random access memory (RAM), or a combination of memories. In alternative embodiments, the components and/or modules disclosed herein can be implemented with hardware, including gate level logic such as a field-programmable gate array (FPGA), or alternatively, a purpose-built semiconductor such as an application-specific integrated circuit (ASIC). Still other embodiments may be implemented with a microcontroller having a number of input/output ports for receiving and outputting data, and a number of embedded routines for carrying out the various functionalities disclosed herein. It will be apparent that any suitable combination of hardware, software, and firmware can be used, and that other embodiments are not limited to any particular system architecture.

Some embodiments may be implemented, for example, using a machine readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, process, or the like, and may be implemented using any suitable combination of hardware and/or software. The machine readable medium or article may include, for example, any suitable type of memory unit, memory device, memory article, memory medium, storage device, storage article, storage medium, and/or storage unit, such as memory, removable or non-removable media, erasable or non-erasable media, writeable or rewriteable media, digital or analog media, hard disk, floppy disk, compact disk read only memory (CD-ROM), compact disk recordable (CD-R) memory, compact disk rewriteable (CR-RW) memory, optical disk, magnetic media, magneto-optical media, removable memory cards or disks, various types of digital versatile disk (DVD), a tape, a cassette, or the like. The instructions may include any suitable type of code, such as source code, compiled code, interpreted code, executable code, static code, dynamic code, encrypted code, and the like, implemented using any suitable high level, low level, object oriented, visual, compiled, and/or interpreted programming language.

Unless specifically stated otherwise, it may be appreciated that terms such as "processing," "computing," "calculating," "determining," or the like refer to the action and/or process of a computer or computing system, or similar electronic computing device, that manipulates and/or transforms data represented as physical quantities (for example, electronic) within the registers and/or memory units of the computer system into other data similarly represented as physical quantities within the registers, memory units, or other such information storage transmission or displays of the computer system. The embodiments are not limited in this context.

The terms "circuit" or "circuitry," as used in any embodiment herein, may comprise, for example, singly or in any combination, hardwired or purpose-built circuitry, programmable circuitry such as computer processors comprising one or more individual instruction processing cores, state machine circuitry, and/or firmware that stores instructions executed by programmable circuitry. The circuitry may include a processor and/or controller configured to execute one or more instructions to perform one or more operations described herein. The instructions may be embodied as, for example, an application, software, firmware, etc. configured to cause the circuitry to perform any of the aforementioned operations. Software may be embodied as a software package, code, instructions, instruction sets and/or data recorded on a computer-readable storage device. Software may be embodied or implemented to include any number of processes, and processes, in turn, may be embodied or implemented to include any number of threads, in a hierarchical fashion. Firmware may be embodied as code, instructions or instruction sets and/or data that are hard-coded (e.g., non-volatile) in memory devices. The circuitry may, collectively or individually, be embodied as circuitry that forms part of a larger system, for example, an integrated circuit (IC), an application-specific integrated circuit (ASIC), a system on-chip (SoC), desktop computers, laptop computers, tablet computers, servers, smart phones, etc. Other embodiments may be implemented as software executed by a programmable control device. As described herein, various embodiments may be implemented using hardware elements, software elements, or any combination thereof. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth.

Numerous specific details have been set forth herein to provide a thorough understanding of the embodiments. It will be understood by an ordinarily-skilled artisan, however, that the embodiments may be practiced without these specific details. In other instances, well known operations, components and circuits have not been described in detail so as not to obscure the embodiments. It can be appreciated that the specific structural and functional details disclosed herein may be representative and do not necessarily limit the scope of the embodiments. In addition, although the subject matter has been described in language specific to structural features and/or methodological acts, it is to be understood that the subject matter defined in the appended claims is not necessarily limited to the specific features or acts described herein. Rather, the specific features and acts described herein are disclosed as example forms of implementing the claims.

Further Example Embodiments

The following examples pertain to further embodiments, from which numerous permutations and configurations will be apparent.

Example 1 is a method for 3-Dimensional (3D) scene analysis. The method comprises: receiving a plurality of 3D image frames of a scene, each frame comprising a red-green-blue (RGB) image frame comprising color pixels and a depth map frame comprising depth pixels, wherein each of the 3D image frames is associated with a pose of a depth camera that generated the 3D image frames; projecting the depth pixels into points in a global coordinate system based on the camera pose; accumulating the projected points into a 3D reconstruction of the scene; detecting objects and associated locations in the scene, for each 3D image frame, based on the camera pose, the 3D reconstruction, the RGB image frame and the depth map frame; segmenting, each of the detected objects in the scene, the segmented objects comprising the points of the 3D reconstruction corresponding to contours of the associated detected object; and registering the segmented objects to a 3D model of the associated detected object to determine an alignment of the detected object in the scene.

Example 2 includes the subject matter of Example 1, further comprising deleting a selected object from the scene by: capturing a new RGB image frame that includes the selected object; generating a 2D mask based on the camera pose associated with the new RGB image frame and the registration corresponding to the selected object; replacing pixels associated with the selected object within the 2D mask, with values based on pixels associated with neighboring regions in the new RGB image frame; and applying the mask to the new RGB image frame.

Example 3 includes the subject matter of Examples 1 and 2, further comprising adding a selected object to the scene by: capturing a new RGB image frame that includes a region where the selected object is to be added; generating a 2D RGB image of the selected object based on the camera pose associated with the new RGB image frame and a 3D model of the selected object; and rendering the 2D RGB image of the selected object onto the new RGB image frame.

Example 4 includes the subject matter of Examples 1-3, further comprising generating a blueprint of the scene based on the registered objects and the associated locations of the detected objects.

Example 5 includes the subject matter of Examples 1-4, wherein each pose of the depth camera is calculated by one of: using a transformation of the camera based on an Iterative Closest Point (ICP) matching operation performed on the depth pixels of the depth map frame; or using a Simultaneous Localization and Mapping (SLAM) operation performed on the color pixels of the RGB image frame; or based on data provided by inertial sensors of the depth camera.

Example 6 includes the subject matter of Examples 1-5, wherein the object detection is based on at least one of template matching, classification using a bag-of-words vision model, and classification using a convolutional neural network.

Example 7 includes the subject matter of Examples 1-6, wherein the object segmentation is based on detecting and removing surface planes from the scene to generate a processed scene; and performing a connected component clustering operation on the processed scene to generate the segmented objects.

Example 8 includes the subject matter of Examples 1-7, wherein the object segmentation further comprises: associating a label with the detected object; calculating a 2-Dimensional (2D) bounding box containing the detected object, and a 3D location of the center of the 2D bounding box; matching the detected object to an existing object boundary set created from a previously received 3D image frame, the matching based on the label and the 3D location of the center of the 2D bounding box; in response to a failure of the matching, creating a new object boundary set associated with the detected object, wherein the object boundary set comprises 3D positions of pixels in the 2D bounding box corresponding to the boundary of the object, and further comprises vectors associated with the pixels, the vectors specifying a ray from the position of the depth camera associated with the corresponding pose, to each of the pixels; and adjusting the object boundary set to remove duplicate pixels generated from different poses of the depth camera, the removal based on the distance of the pixels from the camera and further based on the direction of the associated vectors.

Example 9 includes the subject matter of Examples 1-8, wherein the registration further comprises performing feature matching between the segmented objects and the associated 3D model; and generating an alignment transformation based on the matched features using an Iterative Closest Point (ICP) matching operation and a Random Sample Consensus (RANSAC) operation.

Example 10 is a system for 3-Dimensional (3D) scene analysis. The system comprises: a 3D reconstruction circuit to receive a plurality of 3D image frames of a scene, each frame comprising a red-green-blue (RGB) image frame comprising color pixels and a depth map frame comprising depth pixels, wherein each of the 3D image frames is associated with a pose of a depth camera that generated the 3D image frames, the 3D reconstruction circuit further to project the depth pixels into points in a global coordinate system based on the camera pose and accumulate the projected points into a 3D reconstruction of the scene; an object detection circuit to detect objects and associated locations in the scene, for each 3D image frame, based on the camera pose, the 3D reconstruction, the RGB image frame and the depth map frame; a 3D segmentation circuit to segment each of the detected objects in the scene, the segmented objects comprising the points of the 3D reconstruction corresponding to contours of the associated detected object; and a 3D registration circuit to register the segmented objects to a 3D model of the associated detected object to determine an alignment of the detected object in the scene.

Example 11 includes the subject matter of Example 10, further comprising an augmented reality (AR) manipulation circuit to delete a selected object from the scene by: capturing a new RGB image frame that includes the selected object; generating a 2D mask based on the camera pose associated with the new RGB image frame and the registration corresponding to the selected object; replacing pixels associated with the selected object within the 2D mask, with values based on pixels associated with neighboring regions in the new RGB image frame; and applying the mask to the new RGB image frame.

Example 12 includes the subject matter of Examples 10 and 11, further comprising an AR manipulation circuit to add a selected object to the scene by: capturing a new RGB image frame that includes a region where the selected object is to be added; generating a 2D RGB image of the selected object based on the camera pose associated with the new RGB image frame and a 3D model of the selected object; and rendering the 2D RGB image of the selected object onto the new RGB image frame.

Example 13 includes the subject matter of Examples 10-12, further comprising an AR manipulation circuit to generate a blueprint of the scene based on the registered objects and the associated locations of the detected objects.

Example 14 includes the subject matter of Examples 10-13, wherein each pose of the depth camera is calculated by one of: using a transformation of the camera based on an Iterative Closest Point (ICP) matching operation performed on the depth pixels of the depth map frame; or using a Simultaneous Localization and Mapping (SLAM) operation performed on the color pixels of the RGB image frame; or based on data provided by inertial sensors of the depth camera, and wherein the object detection is based on at least one of template matching, classification using a bag-of-words vision model, and classification using a convolutional neural network.

Example 15 includes the subject matter of Examples 10-14, wherein the object segmentation is based on detecting and removing surface planes from the scene to generate a processed scene; and performing a connected component clustering operation on the processed scene to generate the segmented objects.

Example 16 includes the subject matter of Examples 10-15, wherein the object segmentation circuit is further to: associate a label with the detected object; calculate a 2-Dimensional (2D) bounding box containing the detected object, and a 3D location of the center of the 2D bounding box; match the detected object to an existing object boundary set created from a previously received 3D image frame, the match based on the label and the 3D location of the center of the 2D bounding box; in response to a failure of the match, create a new object boundary set associated with the detected object, wherein the object boundary set comprises 3D positions of pixels in the 2D bounding box corresponding to the boundary of the object, and further comprises vectors associated with the pixels, the vectors specifying a ray from the position of the depth camera associated with the corresponding pose, to each of the pixels; and adjust the object boundary set to remove duplicate pixels generated from different poses of the depth camera, the removal based on the distance of the pixels from the camera and further based on the direction of the associated vectors.

Example 17 includes the subject matter of Examples 10-16, wherein the registration circuit is further to perform feature matching between the segmented objects and the associated 3D model; and generate an alignment transformation based on the matched features using an Iterative Closest Point (ICP) matching operation and a Random Sample Consensus (RANSAC) operation.

Example 18 is at least one non-transitory computer readable storage medium having instructions encoded thereon that, when executed by one or more processors, result in the following operations for 3-Dimensional (3D) scene analysis, the operations comprising: receiving a plurality of 3D image frames of a scene, each frame comprising a red-green-blue (RGB) image frame comprising color pixels and a depth map frame comprising depth pixels, wherein each of the 3D image frames is associated with a pose of a depth camera that generated the 3D image frames; projecting the depth pixels into points in a global coordinate system based on the camera pose; accumulating the projected points into a 3D reconstruction of the scene; detecting objects and associated locations in the scene, for each 3D image frame, based on the camera pose, the 3D reconstruction, the RGB image frame and the depth map frame; segmenting each of the detected objects in the scene, the segmented objects comprising the points of the 3D reconstruction corresponding to contours of the associated detected object; and registering the segmented objects to a 3D model of the associated detected object to determine an alignment of the detected object in the scene.

Example 19 includes the subject matter of Examples 18, further comprising deleting a selected object from the scene by: capturing a new RGB image frame that includes the selected object; generating a 2D mask based on the camera pose associated with the new RGB image frame and the registration corresponding to the selected object; replacing pixels associated with the selected object within the 2D mask, with values based on pixels associated with neighboring regions in the new RGB image frame; and applying the mask to the new RGB image frame.

Example 20 includes the subject matter of Examples 18 and 19, further comprising adding a selected object to the scene by: capturing a new RGB image frame that includes a region where the selected object is to be added; generating a 2D RGB image of the selected object based on the camera pose associated with the new RGB image frame and a 3D model of the selected object; and rendering the 2D RGB image of the selected object onto the new RGB image frame.

Example 21 includes the subject matter of Examples 18-20, further comprising generating a blueprint of the scene based on the registered objects and the associated locations of the detected objects.

Example 22 includes the subject matter of Examples 18-21, wherein each pose of the depth camera is calculated by one of: using a transformation of the camera based on an Iterative Closest Point (ICP) matching operation performed on the depth pixels of the depth map frame; or using a Simultaneous Localization and Mapping (SLAM) operation performed on the color pixels of the RGB image frame; or based on data provided by inertial sensors of the depth camera, and wherein the object detection is based on at least one of template matching, classification using a bag-of-words vision model, and classification using a convolutional neural network.

Example 23 includes the subject matter of Examples 18-22, wherein the object segmentation is based on detecting and removing surface planes from the scene to generate a processed scene; and performing a connected component clustering operation on the processed scene to generate the segmented objects.

Example 24 includes the subject matter of Examples 18-23, wherein the object segmentation further comprises: associating a label with the detected object; calculating a 2-Dimensional (2D) bounding box containing the detected object, and a 3D location of the center of the 2D bounding box; matching the detected object to an existing object boundary set created from a previously received 3D image frame, the matching based on the label and the 3D location of the center of the 2D bounding box; in response to a failure of the matching, creating a new object boundary set associated with the detected object, wherein the object boundary set comprises 3D positions of pixels in the 2D bounding box corresponding to the boundary of the object, and further comprises vectors associated with the pixels, the vectors specifying a ray from the position of the depth camera associated with the corresponding pose, to each of the pixels; and adjusting the object boundary set to remove duplicate pixels generated from different poses of the depth camera, the removal based on the distance of the pixels from the camera and further based on the direction of the associated vectors.

Example 25 includes the subject matter of Examples 18-24, wherein the registration further comprises performing feature matching between the segmented objects and the associated 3D model; and generating an alignment transformation based on the matched features using an Iterative Closest Point (ICP) matching operation and a Random Sample Consensus (RANSAC) operation.

Example 26 is a system for 3-Dimensional (3D) scene analysis. The system comprises: means for receiving a plurality of 3D image frames of a scene, each frame comprising a red-green-blue (RGB) image frame comprising color pixels and a depth map frame comprising depth pixels, wherein each of the 3D image frames is associated with a pose of a depth camera that generated the 3D image frames; means for projecting the depth pixels into points in a global coordinate system based on the camera pose; means for accumulating the projected points into a 3D reconstruction of the scene; means for detecting objects and associated locations in the scene, for each 3D image frame, based on the camera pose, the 3D reconstruction, the RGB image frame and the depth map frame; means for segmenting each of the detected objects in the scene, the segmented objects comprising the points of the 3D reconstruction corresponding to contours of the associated detected object; and means for registering the segmented objects to a 3D model of the associated detected object to determine an alignment of the detected object in the scene.

Example 27 includes the subject matter of Example 26, further comprising means for deleting a selected object from the scene by: capturing a new RGB image frame that includes the selected object; generating a 2D mask based on the camera pose associated with the new RGB image frame and the registration corresponding to the selected object; replacing pixels associated with the selected object within the 2D mask, with values based on pixels associated with neighboring regions in the new RGB image frame; and applying the mask to the new RGB image frame.

Example 28 includes the subject matter of Examples 26 and 27, further comprising means for adding a selected object to the scene by: capturing a new RGB image frame that includes a region where the selected object is to be added; generating a 2D RGB image of the selected object based on the camera pose associated with the new RGB image frame and a 3D model of the selected object; and rendering the 2D RGB image of the selected object onto the new RGB image frame.

Example 29 includes the subject matter of Examples 26-28, further comprising means for generating a blueprint of the scene based on the registered objects and the associated locations of the detected objects.

Example 30 includes the subject matter of Examples 26-29, wherein each pose of the depth camera is calculated by one of: using a transformation of the camera based on an Iterative Closest Point (ICP) matching operation performed on the depth pixels of the depth map frame; or using a Simultaneous Localization and Mapping (SLAM) operation performed on the color pixels of the RGB image frame; or based on data provided by inertial sensors of the depth camera, and wherein the object detection is based on at least one of template matching, classification using a bag-of-words vision model, and classification using a convolutional neural network.

Example 31 includes the subject matter of Examples 26-30, wherein the object segmentation is based on detecting and removing surface planes from the scene to generate a processed scene; and performing a connected component clustering operation on the processed scene to generate the segmented objects.

Example 32 includes the subject matter of Examples 26-31, wherein the object segmentation further comprises: means for associating a label with the detected object; means for calculating a 2-Dimensional (2D) bounding box containing the detected object, and a 3D location of the center of the 2D bounding box; means for matching the detected object to an existing object boundary set created from a previously received 3D image frame, the matching based on the label and the 3D location of the center of the 2D bounding box; means for, in response to a failure of the matching, creating a new object boundary set associated with the detected object, wherein the object boundary set comprises 3D positions of pixels in the 2D bounding box corresponding to the boundary of the object, and further comprises vectors associated with the pixels, the vectors specifying a ray from the position of the depth camera associated with the corresponding pose, to each of the pixels; and means for adjusting the object boundary set to remove duplicate pixels generated from different poses of the depth camera, the removal based on the distance of the pixels from the camera and further based on the direction of the associated vectors.

Example 33 includes the subject matter of Examples 26-32, wherein the registration further comprises means for performing feature matching between the segmented objects and the associated 3D model; and means for generating an alignment transformation based on the matched features using an Iterative Closest Point (ICP) matching operation and a Random Sample Consensus (RANSAC) operation.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications. It is intended that the scope of the present disclosure be limited not be this detailed description, but rather by the claims appended hereto. Future filed applications claiming priority to this application may claim the disclosed subject matter in a different manner, and may generally include any set of one or more elements as variously disclosed or otherwise demonstrated herein.

What is claimed is:
1. A processor-implemented method for 3-Dimensional (3D) scene analysis, the method comprising:
   receiving, by a processor, a plurality of 3D image frames of a scene, each frame comprising a red-green-blue (RGB) image frame comprising color pixels and a depth map frame comprising depth pixels, wherein each of the 3D image frames is associated with a pose of a depth camera that generated the 3D image frames;
   projecting, by the processor, the depth pixels into points in a global coordinate system based on the camera pose;
   accumulating, by the processor, the projected points into a 3D reconstruction of the scene;
   detecting, by the processor, objects and associated locations in the scene, for each 3D image frame, based on the camera pose, the 3D reconstruction, the RGB image frame and the depth map frame;
   associating a label with the detected object;
   calculating a 2-Dimensional (2D) bounding box containing the detected object, and a 3D location of the center of the 2D bounding box;
   matching the detected object to an existing object boundary set created from a previously received 3D image frame, the matching based on the label and the 3D location of the center of the 2D bounding box;
   segmenting, by the processor, each of the detected objects in the scene, the segmented objects comprising the points of the 3D reconstruction corresponding to contours of the associated detected object; and
   registering, by the processor, the segmented objects to a 3D model of the associated detected object to determine an alignment of the detected object in the scene.

2. The method of claim 1, further comprising deleting a selected object from the scene by:
   capturing a new RGB image frame that includes the selected object;
   generating a 2D mask based on the camera pose associated with the new RGB image frame and the registration corresponding to the selected object;

replacing pixels associated with the selected object within the 2D mask, with values based on pixels associated with neighboring regions in the new RGB image frame; and applying the mask to the new RGB image frame.

3. The method of claim 1, further comprising adding a selected object to the scene by:

capturing a new RGB image frame that includes a region where the selected object is to be added;

generating a 2D RGB image of the selected object based on the camera pose associated with the new RGB image frame and a 3D model of the selected object; and rendering the 2D RGB image of the selected object onto the new RGB image frame.

4. The method of claim 1, further comprising generating a blueprint of the scene based on the registered objects and the associated locations of the detected objects.

5. The method of claim 1, wherein each pose of the depth camera is calculated by one of: using a transformation of the camera based on an Iterative Closest Point (ICP) matching operation performed on the depth pixels of the depth map frame; or using a Simultaneous Localization and Mapping (SLAM) operation performed on the color pixels of the RGB image frame; or based on data provided by inertial sensors of the depth camera.

6. The method of claim 1, wherein the object detection is based on at least one of template matching, classification using a bag-of-words vision model, and classification using a convolutional neural network.

7. The method of claim 1, wherein the object segmentation is based on detecting and removing surface planes from the scene to generate a processed scene; and performing a connected component clustering operation on the processed scene to generate the segmented objects.

8. The method of claim 1, wherein the object segmentation further comprises:

in response to a failure of the matching, creating a new object boundary set associated with the detected object, wherein the new object boundary set comprises 3D positions of pixels in the 2D bounding box corresponding to the boundary of the object, and further comprises vectors associated with the pixels, the vectors specifying a ray from the position of the depth camera associated with the corresponding pose, to each of the pixels; and adjusting the new object boundary set to remove duplicate pixels generated from different poses of the depth camera, the removal based on the distance of the pixels from the camera and further based on the direction of the associated vectors.

9. A system for 3-Dimensional (3D) scene analysis, the system comprising:

a 3D reconstruction circuit to receive a plurality of 3D image frames of a scene, each frame comprising a red-green-blue (RGB) image frame comprising color pixels and a depth map frame comprising depth pixels, wherein each of the 3D image frames is associated with a pose of a depth camera that generated the 3D image frames, the 3D reconstruction circuit further to project the depth pixels into points in a global coordinate system based on the camera pose and accumulate the projected points into a 3D reconstruction of the scene;

an object detection circuit to:

detect objects and associated locations in the scene, for each 3D image frame, based on the camera pose, the 3D reconstruction, the RGB image frame and the depth map frame;

associate a label with the detected object;

calculate a 2-Dimensional (2D) bounding box containing the detected object, and a 3D location of the center of the 2D bounding box; and match the detected object to an existing object boundary set created from a previously received 3D image frame, the match based on the label and the 3D location of the center of the 2D bounding box;

a 3D segmentation circuit to segment each of the detected objects in the scene, the segmented objects comprising the points of the 3D reconstruction corresponding to contours of the associated detected object; and a 3D registration circuit to register the segmented objects to a 3D model of the associated detected object to determine an alignment of the detected object in the scene.

10. The system of claim 9, further comprising an augmented reality (AR) manipulation circuit to delete a selected object from the scene by:

capturing a new RGB image frame that includes the selected object;

generating a 2D mask based on the camera pose associated with the new RGB image frame and the registration corresponding to the selected object;

replacing pixels associated with the selected object within the 2D mask, with values based on pixels associated with neighboring regions in the new RGB image frame; and applying the mask to the new RGB image frame.

11. The system of claim 9, further comprising an AR manipulation circuit to add a selected object to the scene by:

capturing a new RGB image frame that includes a region where the selected object is to be added;

generating a 2D RGB image of the selected object based on the camera pose associated with the new RGB image frame and a 3D model of the selected object; and rendering the 2D RGB image of the selected object onto the new RGB image frame.

12. The system of claim 9, further comprising an AR manipulation circuit to generate a blueprint of the scene based on the registered objects and the associated locations of the detected objects.

13. The system of claim 9, wherein each pose of the depth camera is calculated by one of: using a transformation of the camera based on an Iterative Closest Point (ICP) matching operation performed on the depth pixels of the depth map frame; or using a Simultaneous Localization and Mapping (SLAM) operation performed on the color pixels of the RGB image frame; or based on data provided by inertial sensors of the depth camera, and wherein the object detection is based on at least one of template matching, classification using a bag-of-words vision model, and classification using a convolutional neural network.

14. The system of claim 9, wherein the object segmentation is based on detecting and removing surface planes from the scene to generate a processed scene; and performing a connected component clustering operation on the processed scene to generate the segmented objects.

15. The system of claim 9, wherein the object segmentation circuit is further to:

in response to a failure of the match, create a new object boundary set associated with the detected object, wherein the new object boundary set comprises 3D positions of pixels in the 2D bounding box corresponding to the boundary of the object, and further comprises vectors associated with the pixels, the vectors specifying a ray from the position of the depth camera associated with the corresponding pose, to each of the pixels; and adjust the new object boundary set to remove duplicate pixels generated from different poses of the depth camera, the removal based on the distance of the pixels from the camera and further based on the direction of the associated vectors.

16. At least one non-transitory computer readable storage medium having instructions encoded thereon that, when executed by one or more processors, result in the following operations for 3-Dimensional (3D) scene analysis, the operations comprising:

receiving a plurality of 3D image frames of a scene, each frame comprising a red-green-blue (RGB) image frame comprising color pixels and a depth map frame comprising depth pixels, wherein each of the 3D image frames is associated with a pose of a depth camera that generated the 3D image frames;

projecting the depth pixels into points in a global coordinate system based on the camera pose;

accumulating the projected points into a 3D reconstruction of the scene;

detecting objects and associated locations in the scene, for each 3D image frame, based on the camera pose, the 3D reconstruction, the RGB image frame and the depth map frame;

associating a label with the detected object;

calculating a 2-Dimensional (2D) bounding box containing the detected object, and a 3D location of the center of the 2D bounding box;

matching the detected object to an existing object boundary set created from a previously received 3D image frame, the matching based on the label and the 3D location of the center of the 2D bounding box;

segmenting each of the detected objects in the scene, the segmented objects comprising the points of the 3D reconstruction corresponding to contours of the associated detected object; and registering the segmented objects to a 3D model of the associated detected object to determine an alignment of the detected object in the scene.

17. The computer readable storage medium of claim 16, further comprising deleting a selected object from the scene by:

capturing a new RGB image frame that includes the selected object;

generating a 2D mask based on the camera pose associated with the new RGB image frame and the registration corresponding to the selected object;

replacing pixels associated with the selected object within the 2D mask, with values based on pixels associated with neighboring regions in the new RGB image frame; and applying the mask to the new RGB image frame.

18. The computer readable storage medium of claim 16, further comprising adding a selected object to the scene by:

capturing a new RGB image frame that includes a region where the selected object is to be added;

generating a 2D RGB image of the selected object based on the camera pose associated with the new RGB image frame and a 3D model of the selected object; and rendering the 2D RGB image of the selected object onto the new RGB image frame.

19. The computer readable storage medium of claim 16, further comprising generating a blueprint of the scene based on the registered objects and the associated locations of the detected objects.

20. The computer readable storage medium of claim 16, wherein each pose of the depth camera is calculated by one of: using a transformation of the camera based on an Iterative Closest Point (ICP) matching operation performed on the depth pixels of the depth map frame; or using a Simultaneous Localization and Mapping (SLAM) operation performed on the color pixels of the RGB image frame; or based on data provided by inertial sensors of the depth camera, and wherein the object detection is based on at least one of template matching, classification using a bag-of-words vision model, and classification using a convolutional neural network.

21. The computer readable storage medium of claim 16, wherein the object segmentation is based on detecting and removing surface planes from the scene to generate a processed scene; and performing a connected component clustering operation on the processed scene to generate the segmented objects.

22. The computer readable storage medium of claim 16, wherein the object segmentation further comprises:

in response to a failure of the matching, creating a new object boundary set associated with the detected object, wherein the new object boundary set comprises 3D positions of pixels in the 2D bounding box corresponding to the boundary of the object, and further comprises vectors associated with the pixels, the vectors specifying a ray from the position of the depth camera associated with the corresponding pose, to each of the pixels; and adjusting the new object boundary set to remove duplicate pixels generated from different poses of the depth camera, the removal based on the distance of the pixels from the camera and further based on the direction of the associated vectors.

23. The method of claim 1, further comprising:

analyzing each pixel within the 2D bounding box; and computing an associated 3D position for each of the analyzed pixels based on the analysis.

24. The method of claim 23, wherein computing the associated 3D position for each of the analyzed pixels comprises sampling the depth map to obtain the associated depth pixel and projecting that depth pixel to a point in the 3D model.

25. The method of claim 1, further comprising:

analyzing each pixel within the 2D bounding box, and projecting a point ray from each pixel in the direction of the previously received 3D image frame for that pixel; and selecting pixels within a given threshold distance for the new object boundary set being analyzed to be included in the 2D bounding box.

* * * * *